United States Patent
Del Pero et al.

(10) Patent No.: US 12,423,993 B2
(45) Date of Patent: Sep. 23, 2025

(54) SYSTEMS AND METHODS FOR GENERATING LANE DATA USING VEHICLE TRAJECTORY SAMPLING

(71) Applicant: Lyft, Inc., San Francisco, CA (US)

(72) Inventors: Luca Del Pero, London (GB); Robert Kesten, London (GB); Stepan Simsa, London (GB); Michal Szabados, London (GB)

(73) Assignee: Lyft, Inc., San Francisco, CA (US)

( * ) Notice: Subject to any disclaimer, the term of this patent is extended or adjusted under 35 U.S.C. 154(b) by 1100 days.

(21) Appl. No.: 16/917,680

(22) Filed: Jun. 30, 2020

(65) Prior Publication Data

US 2021/0403001 A1 Dec. 30, 2021

(51) Int. Cl.
  *G06V 20/56* (2022.01)
  *B60W 40/04* (2006.01)
  *G06F 18/23* (2023.01)
  *G08G 1/01* (2006.01)

(52) U.S. Cl.
  CPC ........... *G06V 20/588* (2022.01); *B60W 40/04* (2013.01); *G06F 18/23* (2023.01); *G06V 20/56* (2022.01); *G08G 1/0112* (2013.01); *G08G 1/0133* (2013.01); *B60W 2552/10* (2020.02); *B60W 2552/53* (2020.02)

(58) Field of Classification Search
  CPC ..... G06V 20/588; G06V 20/56; B60W 40/04; B60W 2552/53; B60W 2552/10; G08G 1/0112; G08G 1/0133
  See application file for complete search history.

(56) References Cited

U.S. PATENT DOCUMENTS

| | | | |
|---|---|---|---|
| 9,251,277 B2* | 2/2016 | Hampapur | G06F 16/9537 |
| 2018/0096595 A1* | 4/2018 | Janzen | G06V 10/94 |
| 2020/0271458 A1* | 8/2020 | Berry | G01C 21/34 |
| 2021/0403001 A1* | 12/2021 | Del Pero | G01C 21/3815 |
| 2022/0284619 A1* | 9/2022 | Brizzi | G06F 18/22 |

* cited by examiner

*Primary Examiner* — Peter D Nolan
*Assistant Examiner* — Wae L Louie
(74) *Attorney, Agent, or Firm* — Lee Sullivan Shea & Smith LLP

(57) ABSTRACT

Examples disclosed herein may involve a computing system that is operable to (i) identify a set of vehicle trajectories that are associated with a segment of a road network, (ii) identify a first cluster of sampling points between the identified set of vehicle trajectories and a first sampling position along the segment, wherein the first cluster has an associated geospatial position and is inferred to be associated with one given lane of the segment, (iii) identify a subset of vehicle trajectories in the identified set that are inferred to be associated with the given lane between the first sampling position and a second sampling position along the segment, (iv) identify a second cluster of sampling points between the identified subset of vehicle trajectories and the second sampling position, wherein the second cluster has an associated geospatial position, and (v) determine a geospatial geometry of the given lane.

22 Claims, 25 Drawing Sheets

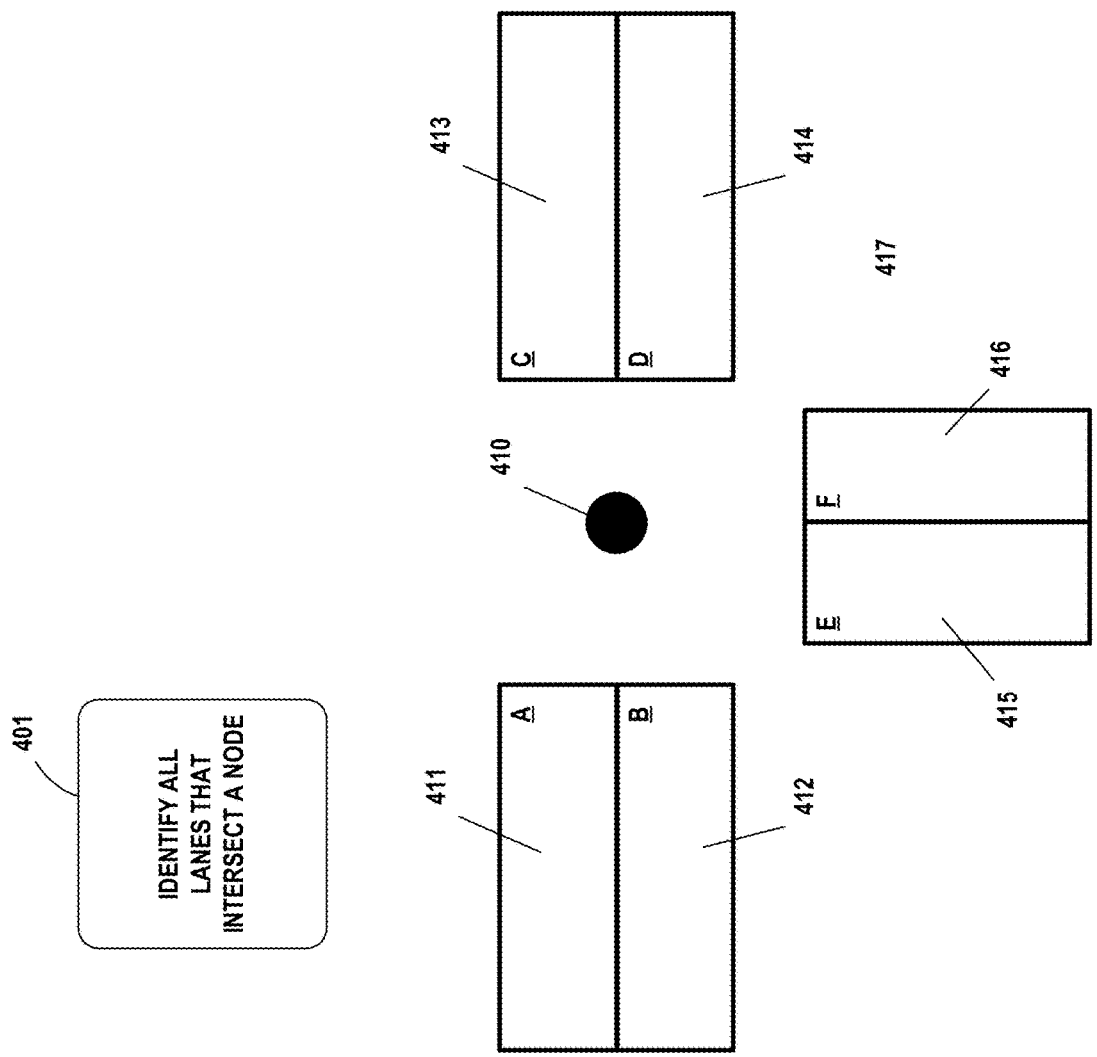

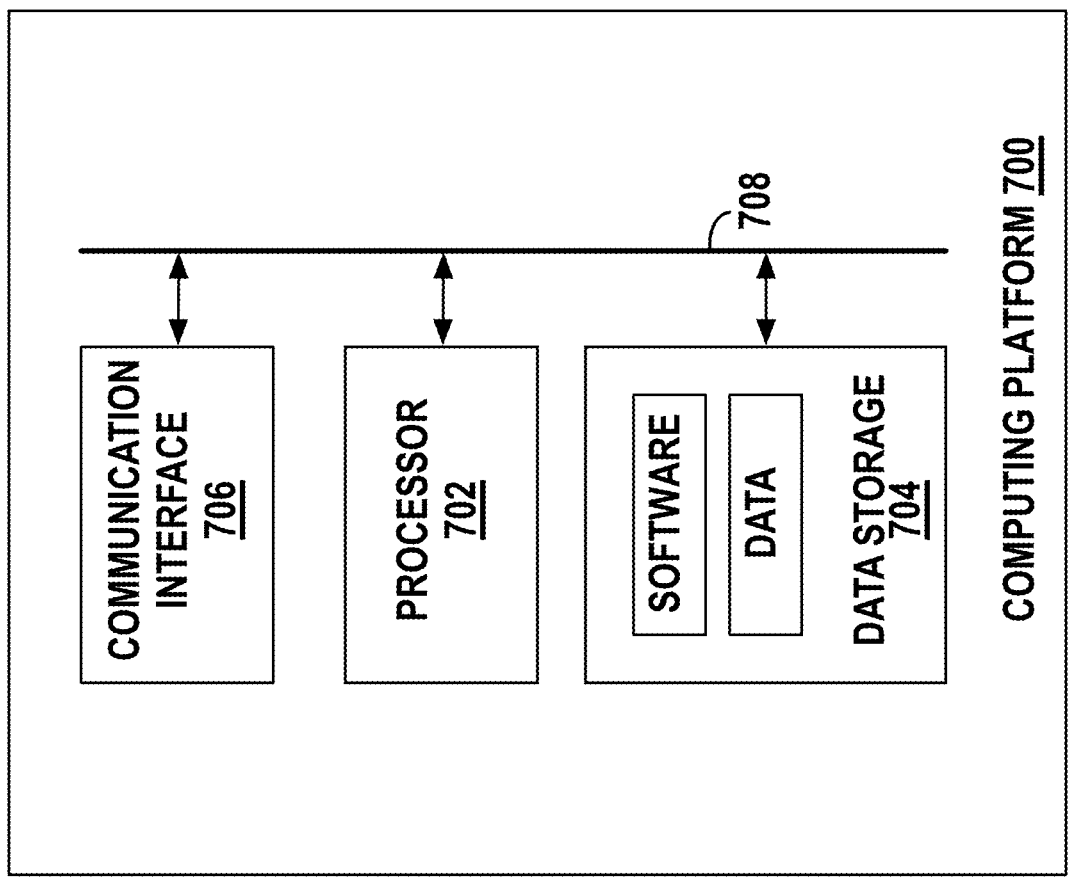

SYSTEMS AND METHODS FOR GENERATING LANE DATA USING VEHICLE TRAJECTORY SAMPLING

BACKGROUND

In various areas of technology, pre-processed information about the world (which may sometimes be referred to as a map or map data) may be utilized to perform various operations. As one example of such a technology area, on-board computing systems of vehicles (e.g., autonomy systems and/or advanced driver assistance systems) may use pre-processed information about the world when performing operations for vehicles such as localization, perception, prediction, and/or planning, among other possibilities. As another example of such a technology area, transportation-matching platforms may use pre-processed information about the world to perform operations such as matching individuals with available vehicles, generating routes for vehicles to follow when picking up and/or transporting individuals, providing estimates of pickup and drop-off times, choosing locations for performing pick and/or drop-offs, and/or pre-positioning vehicles within the given area in anticipation of responding to transportation requests, among other possibilities. It should be understood that pre-processed information about the world (or perhaps other geographically-associated information) may be used in various other areas of technology as well. As such, there is a need for techniques that are capable of generating accurate, up-to-date information about the world that can be used for these applications.

SUMMARY

In one aspect, the disclosed technology may take the form of a method that involves (i) identifying a set of vehicle trajectories that are associated with a segment of a road network, (ii) identifying a first cluster of sampling points between the identified set of vehicle trajectories and a first sampling position along the segment, where the first cluster has an associated geospatial position, and where the first cluster is inferred to be associated with one given lane of the segment, (iii) based on the geospatial position of the first cluster, identifying a subset of vehicle trajectories in the identified set that are inferred to be associated with the given lane between the first sampling position and a second sampling position along the segment, (iv) identifying a second cluster of sampling points between the identified subset of vehicle trajectories and the second sampling position, wherein the second cluster has an associated geospatial position, and (v) based at least on the geospatial positions of the first and second clusters, determining a geospatial geometry of the given lane.

In example embodiments, each vehicle trajectory in the set of vehicle trajectories may comprise a time-sequence of pose values that have been derived from sensor data captured by a vehicle while driving along a segment of the road network.

Further, in example embodiments, identifying the set of vehicle trajectories that are associated with the segment of the road network may comprise (a) defining an area of interest around the segment, (b) accessing a repository of available vehicle trajectories associated with the segment, and (b) identifying, from within the repository of available vehicle trajectories associated with the segment, each vehicle trajectory that at least partially overlaps with the defined area of interest.

Further yet, in example embodiments, the first sampling position may be defined by a centroid of the segment, and the second sampling position may be defined by a point along the segment that is a given distance from the centroid of the segment in a first direction along the segment.

In these example embodiments, the first direction may be parallel to a direction of travel associated with the set of vehicle trajectories.

Further, in these example embodiments, the subset of trajectories that are inferred to be associated with the given lane between the first sampling position and the second sampling position may comprise a first subset of trajectories, and the method may further involve (i) based on the geospatial position of the first cluster, identifying a second subset of trajectories in the identified set that are inferred to be associated with the given lane between the first sampling position and a third sampling position that is defined by a point along the segment that is a given distance from the centroid of the segment in a second direction along the segment, and (ii) identifying a third cluster of sampling points between the second subset of trajectories and the third sampling position, wherein the third cluster is also used as a basis for determining the geospatial geometry of the given lane.

Further still, in example embodiments, identifying the subset of vehicle trajectories that are inferred to be associated with the given lane between the first sampling position and the second sampling position based on the geospatial position of the first cluster may comprise (a) defining an area of interest around geospatial position of the first cluster, and (b) identifying, from within the identified set of vehicle trajectories, each vehicle trajectory that at least partially overlaps with the defined area of interest.

Still further, in example embodiments, identifying the first cluster may comprise determining a first reference point that is representative of the first cluster, and identifying the second cluster may comprise determining a second reference point that is representative of the second cluster.

In these example embodiments, determining the first reference point that is representative of the first cluster may comprise determining a weighted average of the sampling points associated with the first cluster that is based on confidence levels assigned to the trajectories in the identified set, and determining the second reference point that is representative of the second cluster may comprise determining a weighted average of the sampling points associated with the first cluster that is based on confidence levels assigned to the trajectories in the identified subset.

Further, in these example embodiments, the confidence levels assigned to the trajectories in the identified set may be based on one or more of (a) a type of sensor data used to derive the trajectories in the identified subset or (b) a type of technique used to derive the trajectories in the identified subset.

In other example embodiments, determining the geospatial geometry of the given lane may comprise, based at least on the geospatial positions of the first and second clusters, defining a centerline for the given lane and/or boundaries for the given lane.

In these example embodiments, defining the boundaries for the given lane may comprise (a) using the geospatial positions of the first and second clusters as a basis for defining an initial set of geospatial position information for the boundaries of the given lane, (b) accessing image data that is associated with the initial set of geospatial position information for the boundaries of the given lane, (c) detecting lane boundaries within the image data, (d) determining geospatial position information for the detected lane boundaries, and (e) using the determined geospatial position information for the detected lane boundaries to update the initial set of position information for the boundaries of the given lane.

Moreover, in example embodiments, the set of vehicle trajectories that are associated with the segment of the road network may comprise a first set of vehicle trajectories, and the method may further involve (i) identifying a second set of vehicle trajectories that are associated with a node positioned between two or more segments of the road network, where each of the two or more segments has at least one lane, (ii) for each vehicle trajectory in the second set, identifying a respective combination of lanes of the two or more segments that comprises an origin lane and a destination lane associated with the vehicle trajectory, (iii) based on the respective combinations of lanes for the vehicle trajectories in the second set, identifying one or more connections between lanes of the two or more segments, and (iv) for each of the identified one or more connections, defining a junction lane for the node.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 4A is a diagram that illustrates one example function that may be carried out as part of an example pipeline that functions to generate geospatial lane data for a node of a road network in accordance with the present disclosure.

FIG. 7 is a simplified block diagram that illustrates some structural components that may be included in an example computing platform.

DETAILED DESCRIPTION

Figure 1A:
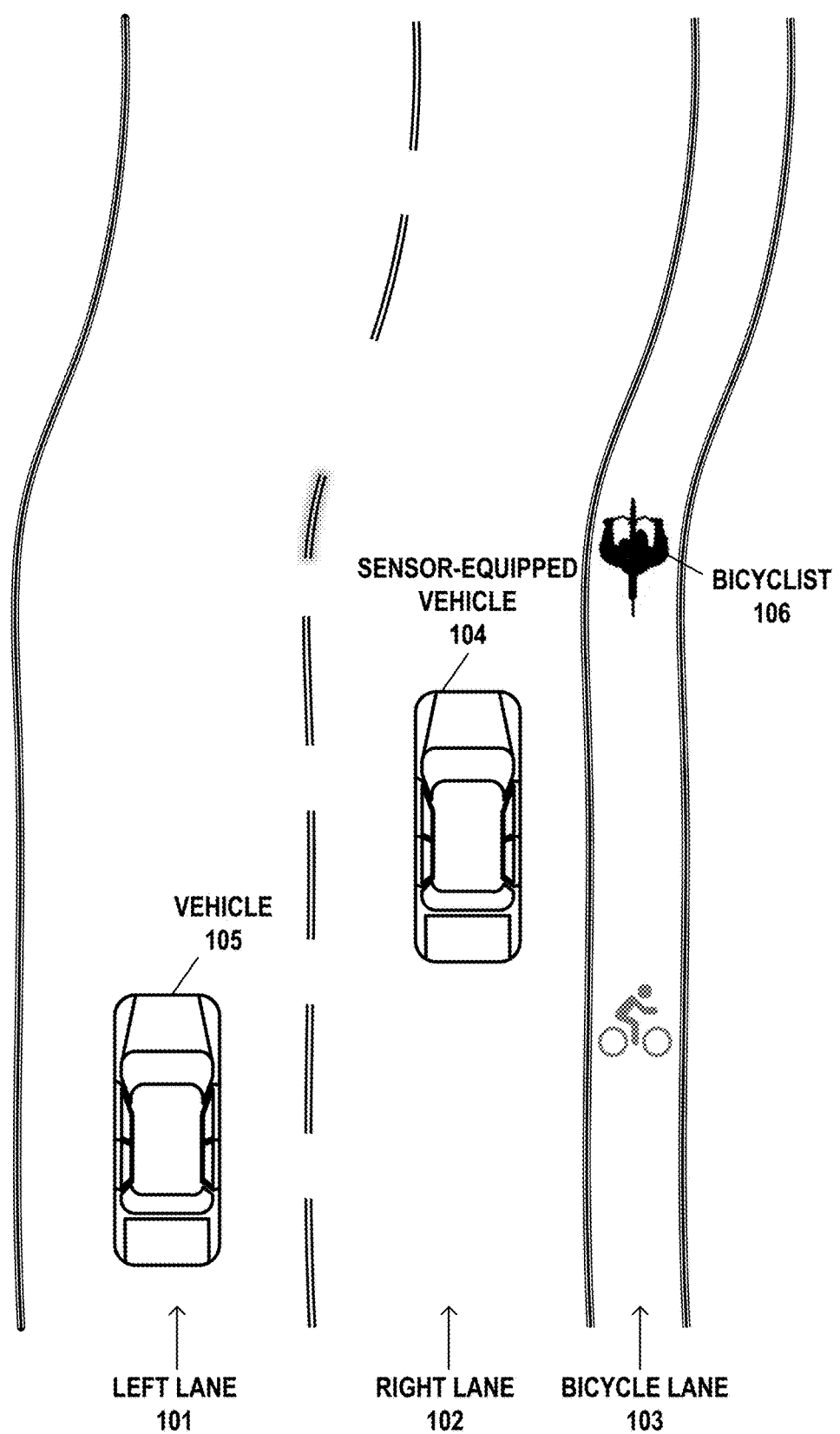
FIG. 1A is a diagram that illustrates a real-world environment in which a sensor-equipped vehicle and other agents are operating at a first time.

As noted above, pre-processed information about the world (which may sometimes be referred to as a map or map data) plays an important role in various areas of technology. For instance, on-board computing systems of vehicles (e.g., autonomy systems and/or advanced driver assistance systems) may use a map that comprises pre-processed information about the world for various purposes. As one specific example, an on-board computing system of a vehicle may be configured to localize the vehicle within a such map and then use other data encoded within the map to help establish a baseline understanding of the real-world environment in which the vehicle is located, such as road-network data that provides information about the road network within the real-world environment in which the vehicle is located, geometric data that provides information about the physical geometry of the real-world environment in which the vehicle is located, and/or semantic data that provides information about the semantic elements within the real-world environment in which the vehicle is located (e.g., lanes, traffic lights, traffic signs, crosswalks, etc.), which can then be utilized by the on-board computing system when performing operations such as perception of other agents in the real-world environment, prediction of the future behavior of agents in the real-world environment, and/or planning of the vehicle's future behavior within the real-world environment. In this way, the map provides the on-board computing system of the vehicle with precomputed baseline information about the vehicle's surrounding environment that generally has a high level of accuracy, which may reduce the need for the on-board computing system to derive this baseline information in real time and thereby reduce the computational burden of the vehicle's on-board computing system while also enhancing the reliability of the operations such as perception, prediction, and planning.

Transportation-matching platforms (e.g., platforms configured to match individuals interested in obtaining transportation with vehicles capable of providing such transportation) may use maps that comprise pre-processed information about the world to perform various different operations, including but not limited to matching individuals with available vehicles within the given area, generating routes for vehicles to follow when picking up and/or transporting individuals within the given area, providing estimates of pickup and drop-off times within the given area, choosing locations for performing pickups and drop-offs within the given area, and/or pre-positioning vehicles within the given area in anticipation of responding to transportation requests, among other possibilities.

It should be understood that pre-processed information about the world may be used in various other areas of technology as well.

One particular type of pre-processed information about the world may take the form of information about the geospatial geometry of the road lanes within a geographic region (i.e., geospatial lane data), which may be utilized by on-board computing systems of vehicles and/or transportation-matching platforms for various purposes. For example, an on-board computing system of a vehicle may use geospatial lane data when planning the vehicle's future behavior in order to ensure that the vehicle is appropriately adhering to lane boundaries when traveling within its current lane, passing agents in adjacent lanes, changing lanes, and turning from one lane into another. As another example, an on-board computing system of a vehicle may use geospatial lane data when performing other operations such as perception of agents surrounding the vehicle, prediction of the future trajectories of agents surrounding the vehicle, and/or identification of certain scenarios of interest encountered by the vehicle (e.g., lane cut ins by surrounding agents such as other vehicles or bicyclists). As yet another example, a transportation-matching platform may use geospatial lane data when performing operations such as generating routes for vehicles to follow when picking up and/or transporting individuals, determining estimates of pickup and drop-off times, and/or choosing locations for performing pickups and drop-offs (e.g., by choosing to pick up a passenger on a road that has three lanes instead of a road that has two lanes to facilitate a safer pickup). Geospatial lane data may be used for various other applications well—including but not limited to applications in other areas of technology.

Figure 1B:
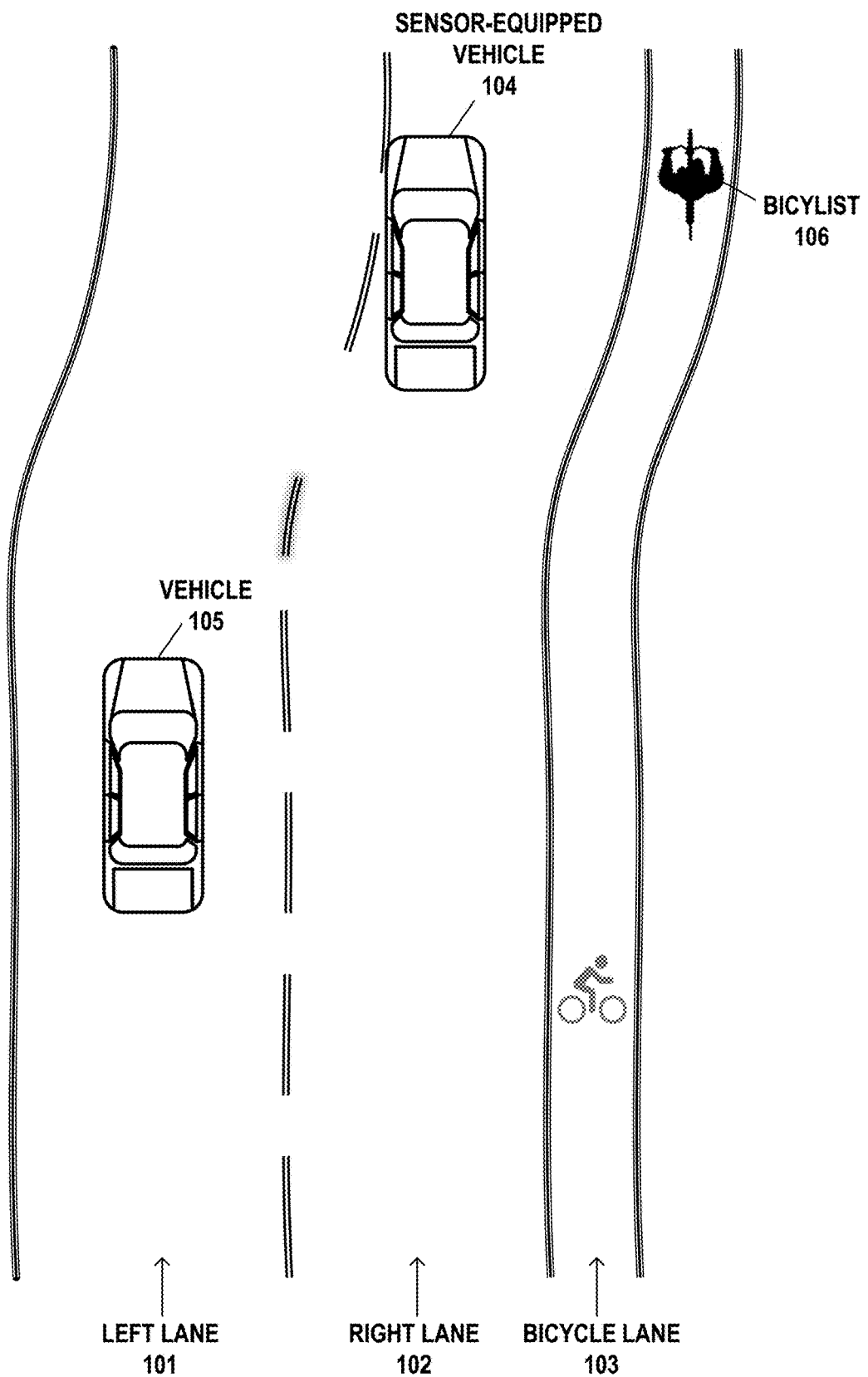
FIG. 1B is a diagram that illustrates the real-world environment of FIG. 1A at a second time in which the sensor-equipped vehicle is exhibiting undesirable driving behavior due to a lack of precomputed lane data.

One possible example of the problems that may arise when accurate, precomputed geospatial lane data is not available to an on-board computing system of a vehicle is illustrated by FIGS. 1A-1B, which depict an example real-world environment 100 in which vehicles and other agents may be operating. As shown in FIGS. 1A-1B, real-world environment 100 includes a northbound road having a left lane 101, a right lane 102, and an adjacent bicycle lane 103.

FIG. 1A depicts real-world environment 100 at a first time when a sensor-equipped vehicle 104 is traveling in right lane 102 of the northbound road, another vehicle 105 is traveling in left lane 101 at some distance behind sensor-equipped vehicle 104, and a bicyclist 106 is traveling in bicycle lane 103 at some distance ahead of sensor-equipped vehicle 104. As shown in FIG. 1A, at this first time, each of sensor-equipped vehicle 104, vehicle 105, and bicyclist 106 is laterally positioned at or near the lateral center of its respective lane.

While sensor-equipped vehicle 104 is operating in real-world environment 100, an on-board computing system of sensor-equipped vehicle 104 may be engaging in a planning operation in order to plan the vehicle's future behavior within real-world environment 100, including the future lateral positioning of sensor-equipped vehicle 104 within right lane 102 as it continues to travel along the northbound road. In this respect, the on-board computing system of sensor-equipped vehicle 104 would typically use precomputed lane data that is encoded into a map for real-world environment 100 along with any additional lane data that is derived during perception in order to determine the geospatial geometry of right lane 102—including the geospatial positioning of the right lane's boundaries—and then plan a trajectory for sensor-equipped vehicle 104 that accounts for the right lane's boundaries such that sensor-equipped vehicle 104 maintains an appropriate lateral position within right lane 102 as it continues to drive along the northbound road.

However, if precomputed lane data for real-world environment 100 is not available, this could lead sensor-equipped vehicle 104 to engage in undesirable driving behavior. Indeed, if the map for real-world environment 100 did not include precomputed lane data, then the on-board computing system of sensor-equipped vehicle 104 would have to rely exclusively on the lane data that it is able to derive from sensor data in order to determine the geospatial geometry of right lane 102 and then plan the future trajectory of sensor-equipped vehicle 104, which can lead to undesirable driving behavior in situations when the sensor data does not provide the on-board computing system with enough information to confidently determine the geospatial positioning of the right lane's boundaries.

For instance, if the vehicle's on-board computing system does not have access to precomputed lane data for right lane 102 at the first time depicted in FIG. 1A, then the on-board computing system may not be able to confidently determine the geospatial positioning of the right lane's boundaries—particularly if lane markings are not clearly represented within the vehicle's captured sensor data—which could lead to a planned trajectory for sensor-equipped vehicle 104 that does not properly take the geospatial positioning of the right lane's boundaries into account. Such a situation is illustrated in FIG. 1B.

In particular, FIG. 1B depicts real-world environment 100 at a second time, after sensor-equipped vehicle 104, vehicle 105, and bicyclist 106 have continued to travel along the northbound road within their respective lanes. However, as shown in FIG. 1B, sensor-equipped vehicle 104 is no longer laterally positioned at or near the lateral center of right lane 102 at this second time. Rather, because the on-board computing system of sensor-equipped vehicle 104 does not have access to precomputed lane data for right lane 102 and the lane markings were not clearly represented in the vehicle's captured sensor data between the first and second times, the on-board computing system was unable to properly account for the geospatial positioning of the right lane's boundaries when planning the vehicle's trajectory between the first and second times, which resulted in sensor-equipped vehicle 104 being laterally positioned all the way to the far left of right lane 102 (i.e., sensor-equipped vehicle 104 is now riding the lane boundary between right lane 102 and left lane 101). However, this type of driving behavior by sensor-equipped vehicle 104 is likely to be considered undesirable—particularly from the perspective of vehicle 105, which may have to break or refrain from passing sensor-equipped vehicle 104 due to the sensor-equipped vehicle's failure to position itself at a more appropriate lateral position within right lane 102.

Attempting to plan the future behavior of a vehicle without accurate, precomputed geospatial lane data for the vehicle's surrounding environment could lead to various other problems as well, including but not limited to difficulties in planning an acceptable trajectory for the vehicle when it is passing other agents, changing lanes, turning, or engaging in other complex driving behaviors.

In line with the discussion above, problems can also arise when accurate, precomputed geospatial lane data is not made available to a transportation-matching platform. For example, if a transportation-matching platform does not have access to accurate, precomputed geospatial lane data, this may lead transportation-matching platform to generate less than optimal routes for vehicles to follow when picking up and/or transporting individuals, determine less accurate estimates of pickup and drop-off times, and/or choose undesirable locations for performing pickups and drop-offs of individuals, which may degrade the experience of the individuals and/or drivers that are participating in the transportation-matching platform.

In view of the foregoing, there is a need for a technique that generates geospatial lane data in a way that is both accurate and scalable (e.g., by expanding the number and quantity of trajectory data used in generating the geospatial lane data). Indeed, geospatial lane data that is generated for use by on-board computing systems of vehicles and/or transportation-matching platforms generally needs have a certain level of accuracy in order to be used for the applications described above. At the same time, geospatial lane data also generally needs to be generated on a very large scale in order to ensure that such lane data is available for any of various different geographic regions throughout the world. For instance, in practice, accurate lane data may need to be generated for nearly every road in a given locality in order to be used for the types of applications discussed above, which means that accurate lane data may eventually need to be generated for many thousands or even millions of different roads throughout the world. However, existing techniques for generating geospatial lane data do not sufficiently satisfy both of these criteria.

Indeed, one existing approach for generating geospatial lane data relies on manual curation of sensor data by humans. For instance, such an approach may involve having human curators review captured sensor data that is representative of a real-world environment for purposes of manually labeling such sensor data with labels (e.g., bounding boxes) that identify the geospatial boundaries of the road lanes appearing within the sensor data, which may then be translated into geospatial lane data. Beneficially, the geospatial lane data generated in this manner typically has the desired level of accuracy. However, this approach of using manual curation by humans to generate geospatial lane data tends to be very time consuming and costly, as it typically requires humans to review and label many different frames of sensor data in order to generate geospatial lane data for even a single road—and this process then has to be repeated for every road in every locality of interest. Thus, such an approach is not suitable for large scale generation of geospatial lane data.

Another existing approach for generating geospatial lane data may make use of vehicles that are equipped with expensive, high-fidelity sensor systems, such as the types of Light Detection and Ranging (LiDAR)-based sensor systems that are commonly found on autonomous vehicles, which may be comprised of a LiDAR unit combined with a 360°-camera array and telematics sensors. As each of these vehicles is being driven within a given area of the real world (typically by humans, but perhaps also with some level of autonomous operation), the vehicle's sensor system captures high-fidelity sensor data that may provide an indication of the geospatial geometry of the lanes in the real world environment (e.g., sensor data that is representative of lane markings, curbs, etc.), and this high-fidelity sensor data may then be used to generate geospatial lane data for the given area. Beneficially, the geospatial lane data generated in this manner also typically has the desired level of accuracy.

However, the total number of vehicles equipped with these types of LiDAR-based sensor systems that currently exist in the world is relatively small—which is due to the fact that equipping vehicles with such sensor systems is expensive and currently provides limited practical value outside of high-definition data collection and autonomous driving—and these vehicles are typically only found in a limited subset of geographic areas (e.g., localities where autonomy-system technology is being tested). As such, it is currently neither practical nor realistic to generate geospatial lane data on a large scale using vehicles with these types of expensive LiDAR-based sensor systems.

To address these and other problems, disclosed herein are new techniques for generating geospatial lane data for a road network in a real-world environment based on trajectory data for vehicles that have previously traveled within the road network, which may be derived from sensor data captured by any system of one or more sensors, embodied in any form, that is capable of capturing sensor data and/or other localization information from which a trajectory having a given level of accuracy (e.g., lane-level accuracy) can be derived—including a system comprising any one or more of a LiDAR unit, a monocular camera, a stereo camera, a Global Positioning System (GPS) unit, an Inertial Measurement Unit (IMU), a Sound Navigation and Ranging (SONAR) unit, and/or a Radio Detection And Ranging (RADAR) unit, among other possible types of sensors In accordance with the disclosed techniques, sensor data captured by sensor systems associated with vehicles operating within a geographic region may first be obtained, and processing (e.g., localization techniques) may then be applied to this captured sensor data in order to derive trajectories for such vehicles within the geographic region. In this respect, each derived vehicle trajectory may generally take the form of a time-sequence of position and orientation (or "pose") values for a vehicle as it was operating within the geographic region, although it is also possible that a derived vehicle trajectory could be represented in terms of a line that has been fitted to the time-sequence of pose values, among other possibilities.

After the vehicle trajectories have been derived for the geographic region, the disclosed techniques may then use the derived vehicle trajectories to generate geospatial lane data for the road network within the geographic region. At a high level, this may involve breaking down the road network within the geographic region into individual elements (e.g., segments and/or nodes), and for each such road-network element, (i) identifying a set of derived vehicle trajectories that are associated with the road-network element, (ii) performing an analysis of the identified set of derived vehicle trajectories to determine where vehicles are most commonly positioned as they traverse the road-network element, and then (iii) based on the analysis, inferring the geospatial geometry of one or more lanes associated with the road-network element. In this way, the disclosed techniques may effectively serve to "aggregate" an available set of derived vehicle trajectories associated with a road-network element in order to produce accurate geospatial lane data for the road-network element.

Advantageously, unlike existing approaches, the disclosed techniques enable geospatial lane data to be generated in a way that is scalable while also achieving a sufficient level of accuracy. Indeed, as noted, the disclosed techniques are capable of generating geospatial lane data based on vehicle trajectory data that is derived from sensor data captured by any system of one or more sensors, embodied in any form, that is capable of capturing sensor data and/or other localization information from which a trajectory having a given level of accuracy (e.g., lane-level accuracy) can be derived—which allows geospatial lane data to be generated on a larger scale, and with less time and expense, than current approaches for generating such geospatial data. At the same time, by intelligently analyzing and aggregating the vehicle trajectory data that is available for a geographic region as described herein, the disclosed techniques are capable of generating geospatial lane data that still has a sufficient level of accuracy to be used for the types of applications discussed above.

For instance, as one possibility, the geospatial lane data that is generated using the disclosed techniques can be encoded into a map that is provided to an on-board computing system of a vehicle (e.g., an autonomy system or an advanced driver assistance system), which may then use the geospatial lane data when performing operations such as perception of agents surrounding the vehicle, prediction of future behavior of agents surrounding the vehicle, planning the future behavior of the vehicle, selecting the most optimal route for the vehicle, and/or estimating the vehicle's time-of-arrival at its planned destination, among other possible operations that may be performed by an on-board computing system of a vehicle.

As another possibility, the geospatial lane data that is generated using the disclosed techniques can be encoded into a map that is provided to a transportation-matching platform, which may use then the geospatial lane data to perform operations such as matching transportation requestors with available vehicles, selecting the most optimal routes for vehicles to follow when picking up and/or transporting requestors, estimating pickup and drop-off times, selecting pickup and drop-off locations, and/or effectively pre-positioning vehicles in anticipation of responding to transportation-matching requests, among other possible operations.

As yet another possibility, the geospatial lane data that is generated using the disclosed techniques can be used to help facilitate the process of encoding other types of data into a map. For example, once the geospatial lane data has been generated for a geographic region, that geospatial lane data can be used to help identify and encode lane-specific prior trajectories into a map for the geographic region, which can in turn be used by on-board computing systems of vehicles and/or transportation-matching platforms to perform various operations. Other examples are possible as well.

As still another possibility, the geospatial lane data that is generated using the disclosed techniques can be used to help identify past instances of certain scenario types of interest that have been encountered in the real world, such as lane cut ins by other vehicles or bicyclists, and these identified scenario-type instances may then be used to train machine learning models for predicting occurrences of scenario types and/or generate simulations in which vehicles operating in a simulated environment are presented with occurrences of scenario types.

The geospatial lane data that is generated using the disclosed techniques can be used for other applications as well—including but not limited to any other mapping applications that may benefit from having access to geospatial lane information at scale anywhere that vehicle trajectory information can be collected.

Figure 2:
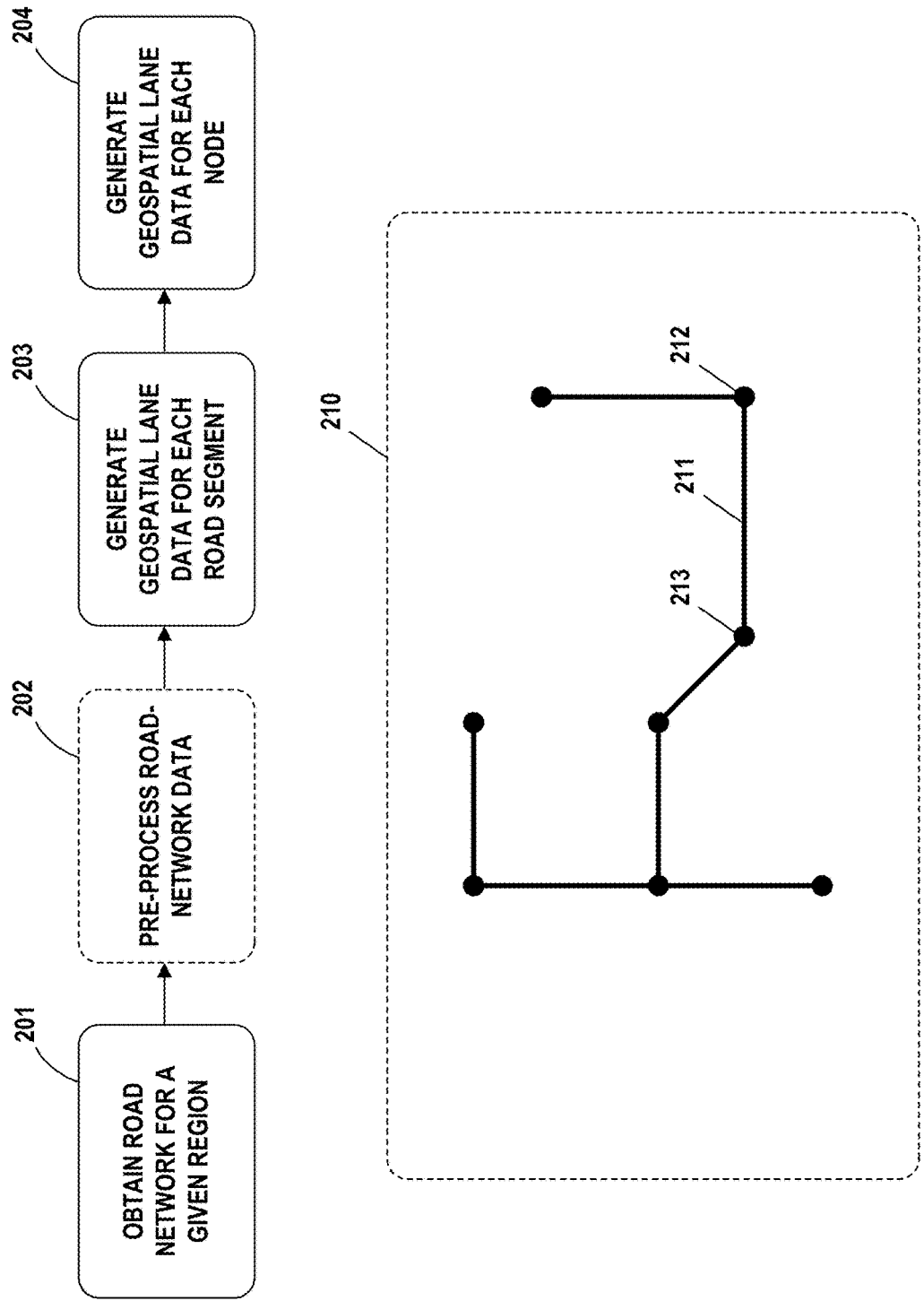
FIG. 2 is a diagram that illustrates an example framework for generating geospatial lane data in accordance with the present disclosure.

One example of a high-level pipeline for generating geospatial lane data in accordance with the present disclosure will now be described with reference to FIG. 2. As shown in FIG. 2, the example pipeline may begin at block 201 by obtaining data defining a road network for a given region (referred to herein as "road-network data"). In this respect, the example pipeline may obtain the road-network data for the given region in various ways. For instance, as one possibility, the example pipeline may access the road-network data from a local or remote data repository. The example pipeline may obtain the road-network data for the given region in other ways as well.

Further, the road-network data for the given region may take various forms. For instance, as one possibility, the road-network data may include certain baseline information about the road network within the given region, which may take the form of (i) "segments" that are representative of the road segments within the given region, and (ii) "nodes" that are representative of the transitions between the road segments within the given region (e.g., intersections, junctions, etc.). The data defining each segment may include an identifier of the segment, data indicating a location of each endpoint node of the segment (e.g., a geospatial coordinate), data indicating a shape of the segment (e.g., a polyline), and perhaps also data indicating a category of the segment (e.g., highway), among other possibilities. In turn, the data defining each node may include an identifier of the node, data indicating a location of the node (e.g., a geospatial coordinate) and perhaps also data indicating a category of the node (e.g., residential intersection), among other possibilities.

One possible example of the above-mentioned road-network data is illustrated in FIG. 2. For instance, as shown in FIG. 2, an example road network 210 may include a series of segments, of which segment 211 is an example, and a series of nodes, of which nodes 212 and 213 are examples. As shown, the segment 211 is positioned between the node 212 and the node 213. In practice, the segment 211 may represent a road segment and the nodes 212 and 213 may represent intersections in which a vehicle can transition from the road segment that is represented by the segment 211 to another road segment (or vice versa).

The road-network data for the given region that is obtained by the example pipeline may take various other forms as well.

Turning to block 202, the example pipeline may optionally pre-process the road-network data. In this respect, the primary purpose for pre-processing the road-network data may be to render the road-network data more suitable for generating geospatial lane data for the given region.

The function of pre-processing the road-network data may take various forms. For instance, as one possibility, the function of pre-processing the road-network data may involve merging two or more nodes together into a single node. The example pipeline may merge two or more nodes together in circumstances where the road-network data contains more than one node for a given intersection and/or junction (e.g., superfluous nodes), among other possible situations where the example pipeline may merge two or more nodes together. As another possibility, the function of pre-processing the road-network data may involve merging two or more segments together into a single segment. The example pipeline may merge two or more segments together in circumstances where the road-network data contains more than one segment for the same road segment, among other possible situations where the example pipeline may merge two or more segments together. The function of pre-processing the road-network data may take other forms as well.

Turning to block 203, the example pipeline may next generate geospatial lane data for each segment within the road network (or at least each of a subset of the segments within the road network). In accordance with the present disclosure, this function may involve the use of a new technique for generating geospatial lane data for a segment within a road network based on derived trajectory data for vehicles that have previously traveled through the given region. One possible implementation of the disclosed technique for generating geospatial lane data for a segment within a road network is described in detail below with respect to FIGS. 3A-3M.

Lastly, at block 204, the example pipeline may generate geospatial lane data for each node within the road network (or at least each of a subset of the nodes within the road network). In accordance with the present disclosure, this function may involve the use of a new technique for generating geospatial lane data for a node within the based on derived trajectory data for vehicles that have previously traveled through the given region. One possible implementation of the disclosed technique for generating geospatial lane data for a node within a road network is described in detail below with respect to FIGS. 4A-4F.

It should be understood that FIG. 2 merely illustrates one possible example of a high-level pipeline for generating geospatial lane data in accordance with the present disclosure, and that a high-level pipeline for generating geospatial lane data in accordance with the present disclosure may take other forms as well, including the possibility that functions may be added, removed, rearranged into different orders, combined into fewer functions, and/or separated into additional functions, depending upon the particular implementation.

An example pipeline that functions to generate geospatial lane data for a segment of a road network in accordance with the present disclosure will now be described with reference to FIGS. 3A-3M.

Figure 3A:
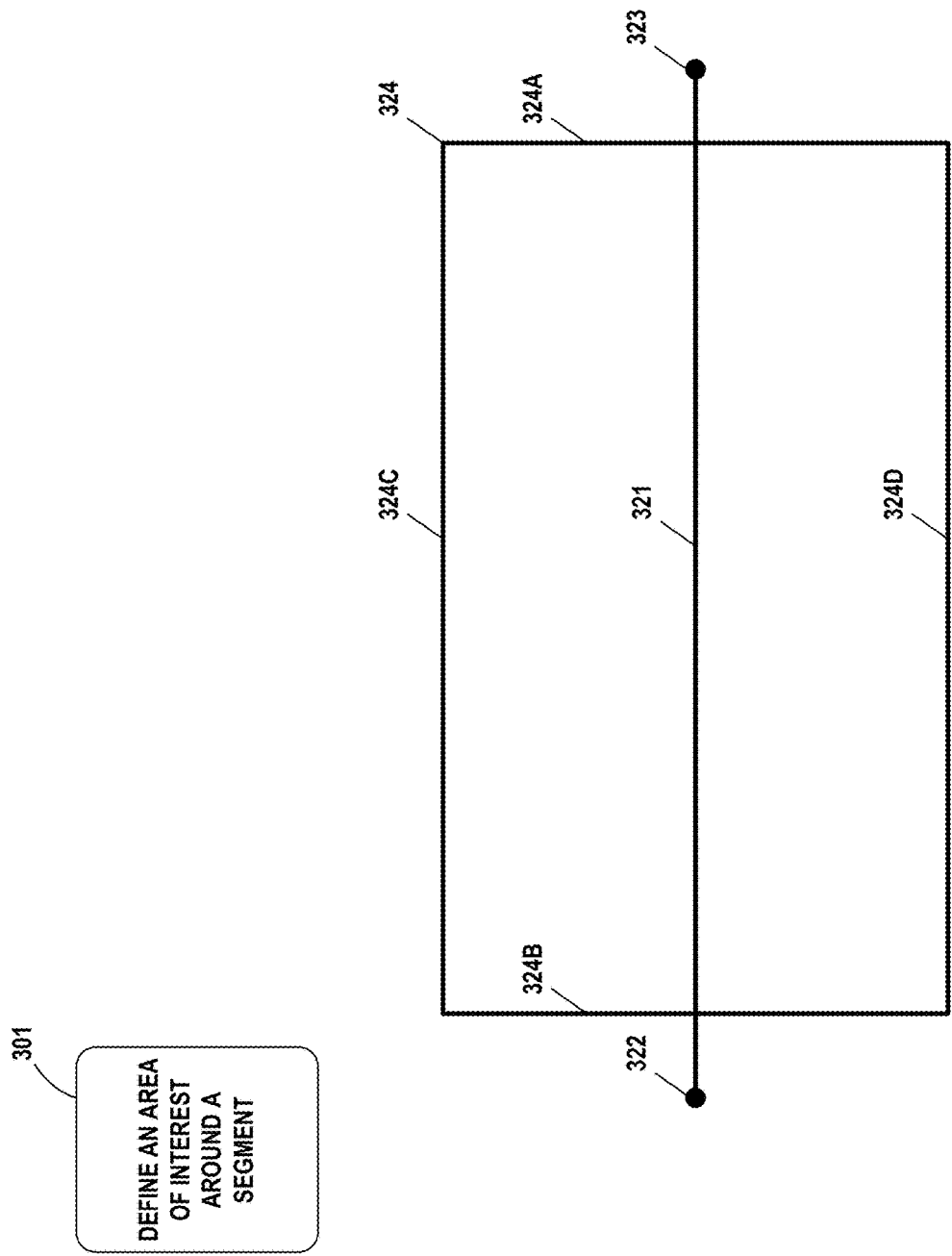
FIG. 3A is a diagram that illustrates one example function that may be carried out as part of an example pipeline that functions to generate geospatial lane data for a segment of a road network in accordance with the present disclosure.

As shown in FIG. 3A, at block 301, the example pipeline may begin by defining an area of interest around a given segment within a road network for which geospatial lane data is to be generated. The manner in which the example pipeline defines the area of interest around a given segment may take various forms.

As one possibility, the example pipeline may define a rectangular area of interest that includes a pair of lengthwise boundaries and a pair of widthwise boundaries. In this respect, the example pipeline may position lengthwise boundaries of the rectangular area of interest in various ways. For instance, as one implementation, the example pipeline may position the lengthwise boundaries at some distance (e.g., 10-30 meters) away from each endpoint node of the given segment. The example pipeline may position the lengthwise boundaries some distance away from each endpoint node for various reasons.

As one example, positioning the lengthwise boundaries some distance away from each endpoint node may increase the accuracy of the generated geospatial lane data for the given segment when compared to positioning the lengthwise boundary at the endpoint node. For instance, as vehicles approach an intersection, it is possible that they will start to behave differently (e.g., may be in a different lateral position within a lane) than they would while traveling along a straight stretch of road. In this respect, generating geospatial lane data using the parts of the trajectories that are derived from these vehicles that are close to a node may degrade the accuracy of the generated geospatial lane data. As such, positioning the lengthwise boundaries some distance away from each endpoint node may assist in reducing the variance in the trajectories.

The example pipeline may position the lengthwise boundaries some distance away from each endpoint node for various other reasons as well.

Further, the distance at which the example pipeline positions the lengthwise boundaries of the area of interest away from each endpoint node may take various forms. For instance, as one example, the distance may be a predefined distance (e.g., 15 meters). As another example, the distance may be determined based on an evaluation of the endpoint node of the given segment for which the lengthwise boundary is being defined. For instance, if the endpoint node corresponds to a three-way intersection, there might be a lower degree of variance in the derived trajectories as they approach the endpoint node as there are only two directions in which the vehicle can travel. In this respect, the distance at which the example pipeline positions the lengthwise boundary away from the endpoint node may be smaller (e.g., 5-10 meters). Conversely, if the endpoint node corresponds to a four-way intersection, there might be a higher degree of variance in the derived trajectories as they approach the endpoint node as there are three directions in which the vehicle can travel. As such, the distance at which the example pipeline positions the lengthwise boundaries of the area of interest may be larger (e.g., 10-20 meters).

Further yet, it should be understood that the distance at which the example pipeline positions the lengthwise boundaries may be different for each endpoint node (e.g., 15 meters away from one endpoint node and 10 meters away from the other endpoint node) depending on the evaluation of the corresponding endpoint node or various other criteria.

The distance at which the example pipeline positions the lengthwise boundaries of the area of interest away from each endpoint node may take other forms as well.

The example pipeline may position lengthwise boundaries of the area of interest in various other ways as well.

The example pipeline may also position widthwise boundaries of the rectangular area of interest in various ways. For instance, as one implementation, this function may involve positioning the widthwise boundaries at some distance on each side of the given segment. The distance at which the example pipeline positions the widthwise boundaries on each side of the given segment may take various forms. As one example, the distance may be a predefined distance (e.g., 20 meters). As another example, the distance may be determined based on information about the given segment (e.g., a geographic location of the given segment, a type of the given segment, etc.). The distance at which the example pipeline positions the widthwise boundaries on each side of the given segment may take other forms as well.

Further, the shape of the widthwise boundaries may take various forms. In one example, the shape of the widthwise boundaries may mirror the shape of the given segment. In another example, the shape of the widthwise boundaries may be uniform (e.g., straight) regardless of the shape of the given segment. The shape of the widthwise boundaries may take other forms as well.

The example pipeline may position the widthwise boundaries of the area of interest in other manners as well.

One possible example of the function of defining an area of interest around a given segment is illustrated in FIG. 3A. As shown in FIG. 3A, a segment 321 is positioned between node 322 and node 323. Further, as shown, an area of interest 324 has been defined around the segment 321. The area of interest 324 includes lengthwise boundaries 324A and 324B and widthwise boundaries 324C and 324D. In line with the discussion above, the lengthwise boundaries 324A and 324B of the area of interest 324 are perpendicular to the segment 321 and positioned at a distance away from the nodes 322 and 323. Further, the widthwise boundaries 324C and 324D of the area of interest 324 are positioned at a distance on each side of the segment 321. Additionally, as shown, the widthwise boundaries 324C and 324D mirror the shape of the segment 321 (e.g., the widthwise boundaries 324C and 324D are straight because the segment 321 is straight).

The form of the area of interest, and the manner in which the example pipeline defines the area of interest around the given segment, may take various other forms as well.

Figure 3B:
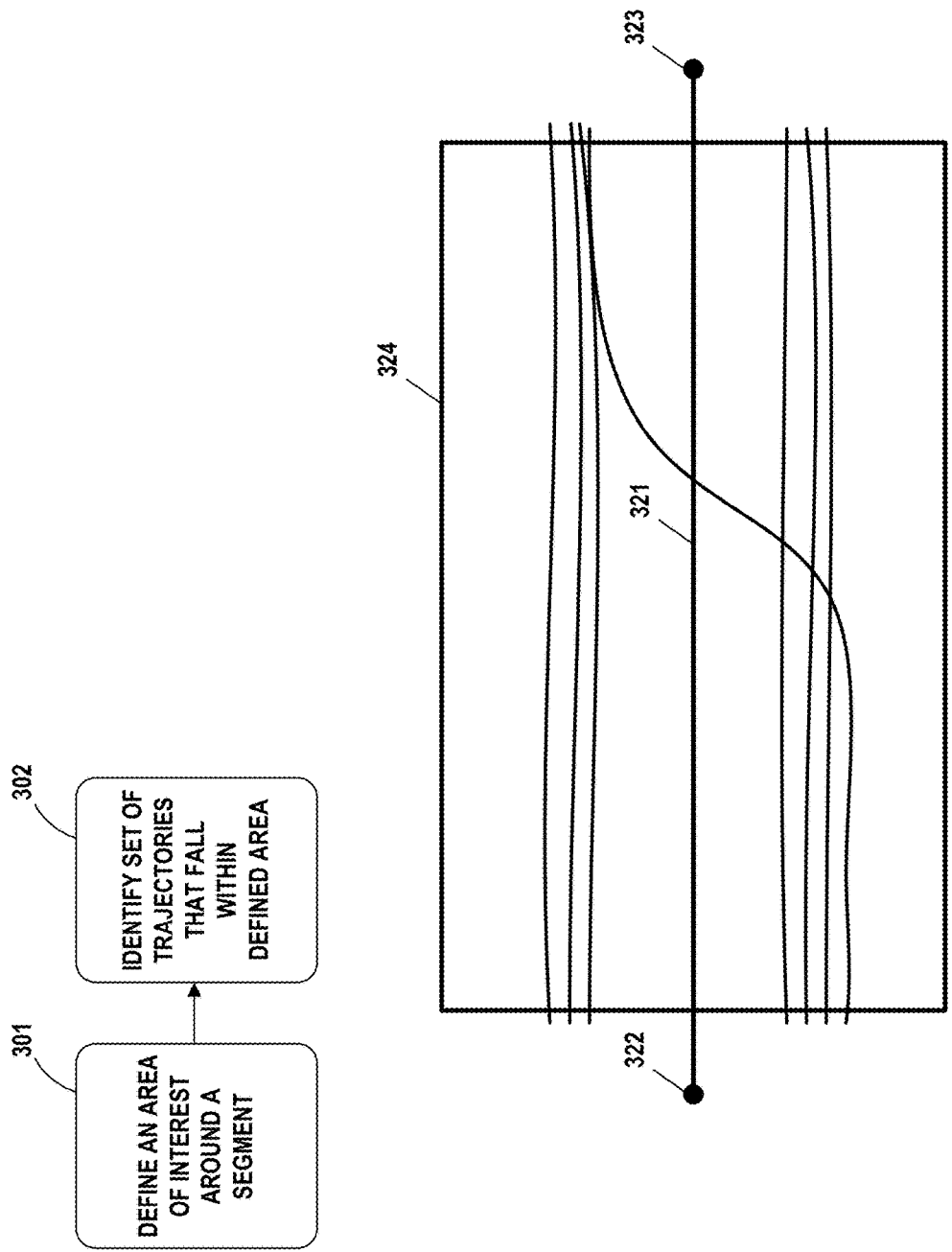
FIG. 3B is a diagram that illustrates another example function that may be carried out as part of an example pipeline that functions to generate geospatial lane data for a segment of a road network in accordance with the present disclosure.

Turning to FIG. 3B, at block 302, the example pipeline may identify a set of derived vehicle trajectories that fall within the defined area of interest. The function of identifying the set of derived vehicle trajectories that fall within the defined area of interest may take various forms.

For instance, as one possibility, the example pipeline may first query a repository of available, previously-derived trajectories for the given region to identify a set of derived vehicle trajectories that fall within the defined area of interest around the given segment. In accordance with the present disclosure, the previously-derived trajectories in such a repository may comprise trajectories that have been derived by applying processing (e.g., localization techniques) to sensor data captured by sensor systems associated with vehicles that have previously traveled within the geographic region. In this respect, as discussed above, these sensor systems may each take the form of any system of one or more sensors, embodied in any form, that is capable of capturing sensor data and/or other localization information from which a representation of a trajectory having a given level of accuracy (e.g., lane-level accuracy) can be derived—including a system comprising any one or more of a LiDAR unit, a monocular camera, a stereo camera, a GPS unit, an IMU, a SONAR unit, and/or a RADAR unit, among other possible types of sensors. However, the previously-derived trajectories in the repository may originate in other manners as well.

Further, the previously-derived trajectories in the repository may take any of various forms. As one possibility, each of the previously-derived trajectories in the repository may take the form of a time-sequence of pose values and/or a representation of a line that has been fitted to the time-sequence of pose values, among other possibilities. Further, each of the previously-derived trajectories in the repository could also have an associated level of confidence, which may be determined based on factors such as the particular type(s) of sensor data used to derive the trajectory and/or the particular technique used to derive the trajectory, among other possibilities. As one possible example to illustrate, trajectories that have been derived from sensor data captured by a LiDAR-based sensor system comprising a LiDAR unit, a camera array, and telematics sensors may be associated with a higher level of confidence, trajectories that have been derived from sensor data captured by a camera-based sensor system comprising a monocular and/or stereo camera and telematics sensors may be associated with an intermediate level of confidence, and trajectories that have been derived from sensor data captured by a telematics-only sensor system comprising a GPS unit and/or an IMU unit may be associated with a lower level of confidence. However, in line with the discussion above, the trajectories may be derived from any of various different types of sensor data and may be associated with various other confidence levels. The previously-derived trajectories in the repository may take various other forms as well.

Further yet, the function of querying the repository of previously-derived trajectories may take various forms. As one example, the function may involve querying the repository for all previously-derived trajectories having at least one pose that falls within the defined area of interest. As another example, the function may involve querying the repository for all previously-derived trajectories that have at least a threshold extent of poses that fall within the defined area of interest. The function of querying the repository of previously-derived trajectories may take other forms as well.

The example pipeline may then obtain data defining each of the identified previously-derived trajectories in any of various manners. For instance, at a minimum, the function of obtaining the data defining an identified previously-derived trajectory may involve obtaining every pose of the identified previously-derived trajectory that falls within the lengthwise boundaries of the defined area of interest. Further, in some implementations, the function of obtaining the data defining an identified previously-derived trajectory may additionally involve obtaining one pose that falls on the outside of each lengthwise boundary of the defined area of interest, in order to ensure that the identified previously-derived trajectory intersects the lengthwise boundaries of the defined area of interest and thereby allow clusters of sampling points to be identified all the way up to and including the lengthwise boundaries of the defined area of interest. This is discussed in detail below with respect to FIG. 3E. Further yet, in some implementations, the function of obtaining the data defining an identified previously-derived trajectory may optionally involve removing one or more poses of the previously-derived trajectory that fall outside of the widthwise boundaries of the defined area of interest, which may have the potential to degrade the accuracy of the generated geospatial lane data when used. The function of obtaining data defining each of the identified previously-derived trajectories may take other forms as well.

One possible example of the function of identifying a set of derived vehicle trajectories that fall within the defined area of interest is illustrated in FIG. 3B. As shown in FIG. 3B, a set of derived vehicle trajectories have been identified as falling within the defined area of interest 324, and data defining this set of derived vehicle trajectories has been obtained. In this respect, while the obtained data defining each identified trajectory may take the form of a set of poses, the data defining each identified trajectory is shown in FIG. 3B as a line that has been fitted to the set of poses that define the trajectory. Further, the fitted line for each identified trajectory is shown to extend beyond the lengthwise boundaries of the defined area of interest 324, which reflects that the obtained data defining each identified trajectory may include one pose value that extends beyond each lengthwise boundary of the defined area of interest 324.

The function of identifying a set of derived vehicle trajectories that fall within the defined area of interest may take other forms as well.

Figure 3C:
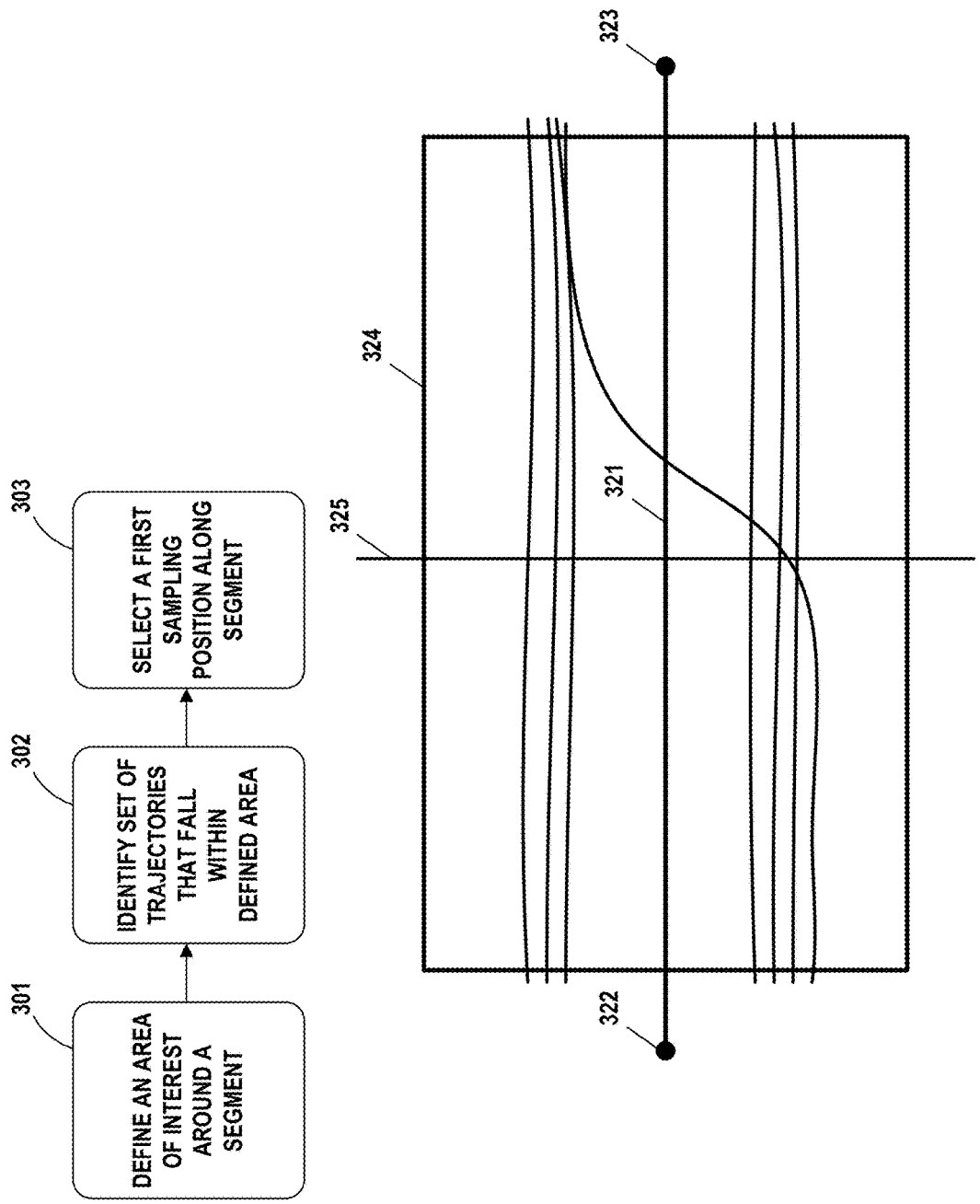
FIG. 3C is a diagram that illustrates another example function that may be carried out as part of an example pipeline that functions to generate geospatial lane data for a segment of a road network in accordance with the present disclosure.

Turning to FIG. 3C, at block 303, the example pipeline may select a first sampling position along the given segment, which may be represented in terms of a line that is perpendicular to the given segment and intersects the given segment at a first reference point. In this respect, the first reference point may comprise any of various points along the given segment, including but not limited to a centroid of the given segment, among other points.

One possible example of the function of selecting a first sampling position along the given segment is illustrated in FIG. 3C. As shown in FIG. 3C, a first sampling position 325 has been selected along the segment 321, which is represented in terms of a perpendicular line that intersects the segment 321 at the centroid point of the segment 321.

The function of selecting the first sampling position along the given segment may take other forms as well.

Figure 3D:
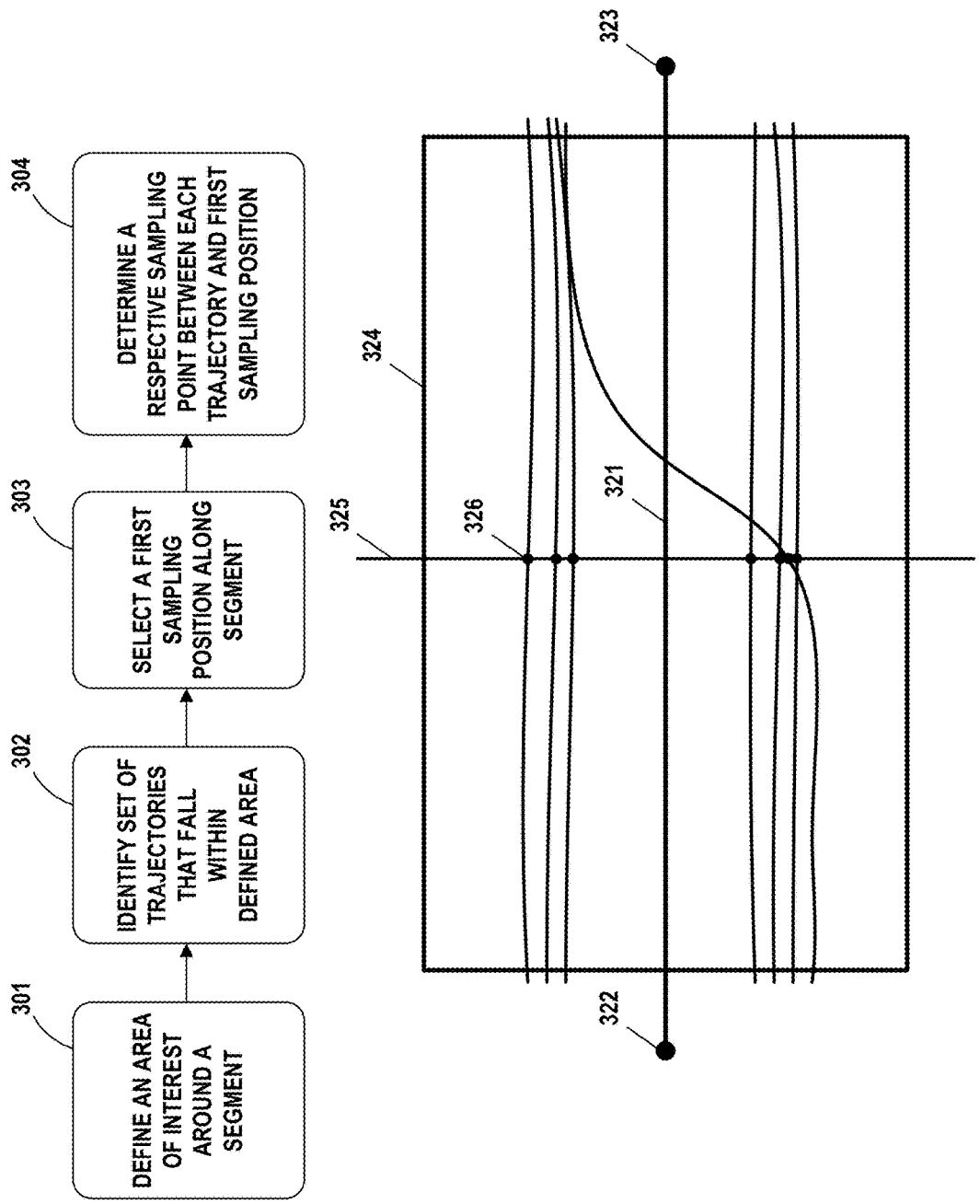
FIG. 3D is a diagram that illustrates another example function that may be carried out as part of an example pipeline that functions to generate geospatial lane data for a segment of a road network in accordance with the present disclosure.

Turning to FIG. 3D, at block 304, the example pipeline may determine a respective sampling point for each identified trajectory that represents the intersection between the identified trajectory and the first sampling position. The function of determining a respective sampling point for each identified trajectory may take various forms, which may depend on the form of the obtained data defining each identified trajectory.

For instance, if the obtained data defining an identified trajectory takes the form of a fitted line, the function may simply involve determining a sampling point that represents the intersection between the identified trajectory and the first sampling position. On the other hand, if the obtained data defining an identified trajectory takes the form of a time-sequence of pose values, the function may involve (i) fitting a line to the time-sequence of pose values for the identified trajectory and (ii) determining a sampling point represents the intersection between the fitted line and the first sampling position.

One possible example of the function of determining a respective sampling point between each identified trajectory and the first sampling position is illustrated in FIG. 3D. As shown in FIG. 3D, a respective sampling point has been determined between each trajectory and the first sampling position 325, of which sampling point 326 is an example.

The function of determining a respective sampling point for each identified trajectory that represents the intersection between the identified trajectory and the first sampling position may take other forms as well.

Figure 3E:
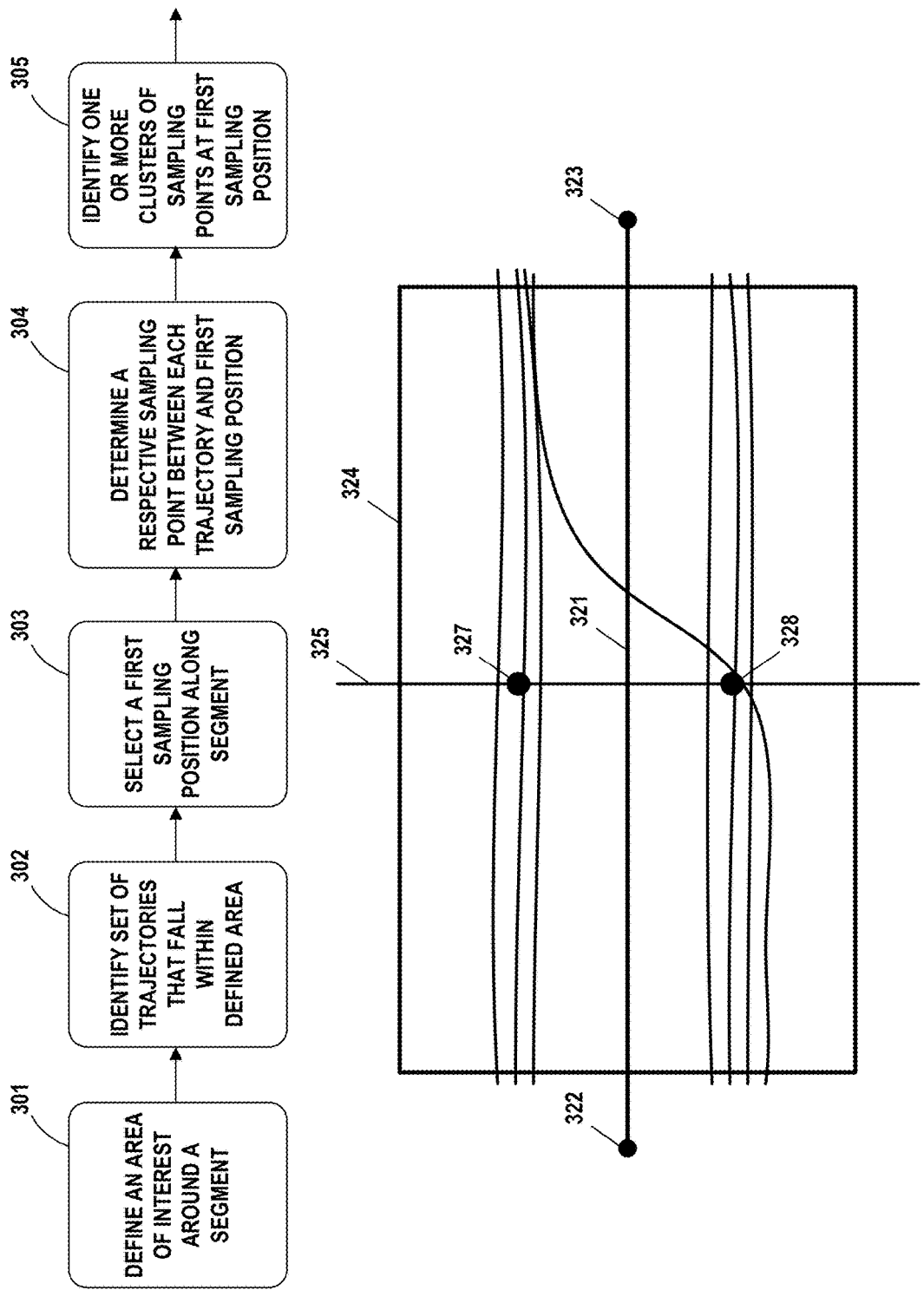
FIG. 3E is a diagram that illustrates another example function that may be carried out as part of an example pipeline that functions to generate geospatial lane data for a segment of a road network in accordance with the present disclosure.

Turning to FIG. 3E, at block 305, the example pipeline may identify one or more clusters of sampling points at the first sampling position. The function of identifying the one or more clusters of sampling points at the first sampling position may take various forms.

For instance, as one possibility, the function of identifying the one or more clusters of sampling points at the first sampling position may involve applying a clustering technique (e.g., k-means clustering technique) to the set of respective sampling points along the first sampling position. In this respect, the applied clustering technique may generally function to (i) define an initial set of clusters of sampling points, (ii) iteratively merge clusters of sampling points starting with the initial set of clusters based on various criteria until a final set of clusters is identified, and (iii) identify a reference point (e.g., a centroid) for each cluster of sampling points in the final set.

The clustering technique's function of defining an initial set of clusters may take various forms. As one example, the function may involve defining a separate cluster at each respective sampling point along the first sampling position. In this respect, the initial set of clusters may comprise a separate cluster for each respective sampling point along the first sampling position. As another example, the function may involve defining clusters of sampling points randomly along the first sampling position. In this example, the number of initially-defined clusters may also be random or may be based on prior knowledge of the given segment (e.g., prior knowledge that the given segment has two lanes). The function of defining an initial set of clusters may take other forms as well.

Further, the clustering technique's function of iteratively merging clusters of sampling points within the initial set of clusters may take various forms that may depend on various criteria. As one example, the function may involve iteratively merging clusters of sampling points until a predetermined distance (e.g., 5 meters) between adjacent clusters of sampling points is achieved. In this respect, the function may involve, for each pair of adjacent clusters in the initial set, (i) determining the distance between each pair of adjacent clusters, (ii) removing one of the two adjacent clusters if the adjacent clusters are too close to one another (e.g. at a distance less than the predetermined distance), and (iii) repeating the function until each cluster is at least the predetermined distance away from an adjacent cluster. In this example, the predetermined distance may correspond to an expected distance between lanes in a real-world environment, among other possibilities. As another example, if the number of lanes for the given segment are known, the function may involve iteratively merging clusters of sampling points until the number of remaining clusters is equal to the number of lanes for the given segment. The function of iteratively merging clusters of sampling points within the initial set of clusters may take other forms as well.

Further yet, the clustering technique's function of identifying a reference point such as a centroid for each cluster of sampling points in the final set may take various forms. As one example, the function may involve, for each cluster of sampling points in the final set, (i) calculating a robust average of the sampling points that are within the cluster, and (ii) using the robust average as the centroid for the cluster of sampling points.

As another example, the function may involve, for each cluster of sampling points in the final set, (i) calculating a weighted average of the sampling points that are within the cluster, and (ii) using the weighted average as the centroid for the cluster of sampling points. In this example, the sampling points within a cluster may be weighted based on various criteria. For instance, as one implementation, a respective weight may be assigned to each sampling point based on a confidence level associated with the sampling point's corresponding trajectory, which may have previously been determined based on based on factors such as the particular type(s) of sensor data used to derive the trajectory and/or the particular technique used to derive the trajectory, among other possibilities. In this respect, it may be the case that (i) trajectories derived using 3D sensor data (e.g., perhaps in combination with 2D image data and/or telematics data) will be associated with a higher confidence level, in which case the sampling points of such trajectories may be assigned a higher weight, (ii) trajectories derived using 2D image data (e.g., perhaps in combination with telematics data) will be associated with an intermediate confidence level, in which case the sampling points of such trajectories may be assigned an intermediate weight, and (iii) trajectories derived using telematics data alone will be associated with a lower confidence level, in which case the sampling points of such trajectories may be assigned a lower weight. However, the confidence level associated with the trajectories, and the corresponding weights assigned to the sampling points, may take various other forms as well. Further, criteria other than the confidence levels associated with the trajectories may also be used to assign weights to the sampling points.

The function of identifying a reference point for each cluster of sampling points in the final set may take other forms as well—including but not limited to the possibility that the reference point may be something other than a centroid for a cluster.

One possible example of the function of identifying one or more clusters of sampling points at the first sampling position is illustrated in FIG. 3E. As shown in FIG. 3E, cluster centroids 327 and 328 have been identified along the first sampling position 325. In line with the discussion above, each of cluster centroids 327 and 328 may represent a robust average of the sampling points shown and described with respect to FIG. 3D.

The function of identifying the one or more clusters of sampling points at the first sampling position may take other forms as well In practice, the example pipeline may infer that each identified cluster at the first sampling point is associated with a different lane of the given segment, and may further infer that the determined reference point for each identified cluster corresponds to a position of a centerline of a respective lane at the first sampling position along the given segment. For instance, with reference to the illustration in FIG. 3E, the example pipeline may infer that the cluster centroid 327 is associated with a first lane of the segment 321 and the cluster centroid 328 is associated with a second lane of the segment 321. The example pipeline may then proceed through a sequence of additional functions for each such lane in order to identify additional points that can be used to define the geometry of the lane.

For purposes of explanation, this sequence of additional functions (e.g., blocks 306-312) will be described with reference to a first identified cluster at the first sampling point that is inferred to be associated with a first lane, but it should be understood that the example pipeline may function to carry out this sequence of additional functions for any other identified cluster along the first sampling point as well. (Further, it should be understood that this particular sequence of additional functions merely comprises one possible example, and that the sequence of additional functions may take various other forms as well, including the possibility that functions may be added, removed, rearranged into different orders, and/or grouped together).

Figure 3F:
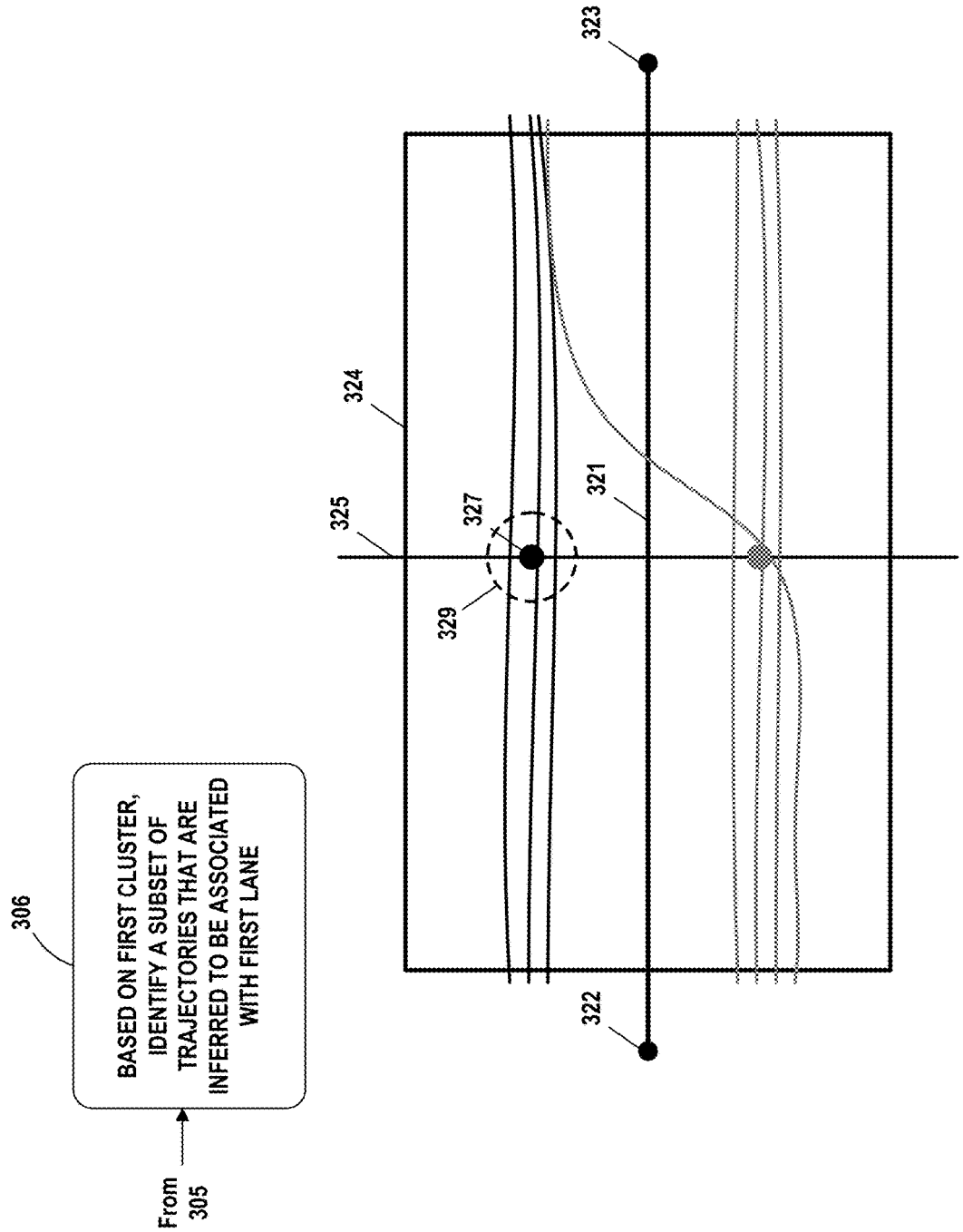
FIG. 3F is a diagram that illustrates another example function that may be carried out as part of an example pipeline that functions to generate geospatial lane data for a segment of a road network in accordance with the present disclosure.

Turning to FIG. 3F, at block 306, the example pipeline may use the position of the first identified cluster at the first sampling position as a basis for identifying a subset of trajectories that are inferred to be associated with the first lane between the first sampling position and a next sampling position (e.g., a second sampling position). This function may take various forms.

For instance, as one possibility, the function of identifying the subset of trajectories that are inferred to be associated with the first lane between the first sampling position and a next sampling position may begin by defining an area around the first identified cluster of sampling points at the first sampling position. The defined area may take various forms. As one example, the defined area may be a circular area that is centered on the first identified cluster's centroid and has a radius of a given length, which may take various forms. For instance, as one implementation, the length of the radius may be a predetermined value (e.g., one meter). As another implementation, the length of the radius may be determined based on one or more characteristics of the first identified cluster (e.g., proximity to an endpoint node, proximity to other identified clusters, etc.). The length of the radius of the defined area may take other forms as well. The defined area may take other forms as well.

In turn, the function of identifying the subset of trajectories that are inferred to be associated with the first lane between the first sampling position and a next sampling position may involve identifying trajectories from the identified set that pass through the defined area. This function may take various forms. As one example, the function may involve determining whether the lines that have been fitted to the pose values for the trajectories from the identified set pass through the defined area. The function of identifying the subset of trajectories that are inferred to be associated with the first lane between the first sampling positions and a next sampling position may take other forms as well.

One possible example of the function of identifying a subset of trajectories that are inferred to be associated with the first lane between the first sampling position and a next sampling position is illustrated in FIG. 3F. As shown in FIG. 3F, a circular area 329 is defined around the centroid 327. Further, a subset of trajectories has been identified as being associated with the first lane. As illustrated, the trajectories that were identified as being associated with the first lane are shown in black, while the trajectories that were not identified are shown in gray.

The function of identifying a subset of trajectories that are inferred to be associated with the first lane between the first sampling position and a next sampling position may take various other forms as well.

Figure 3G:
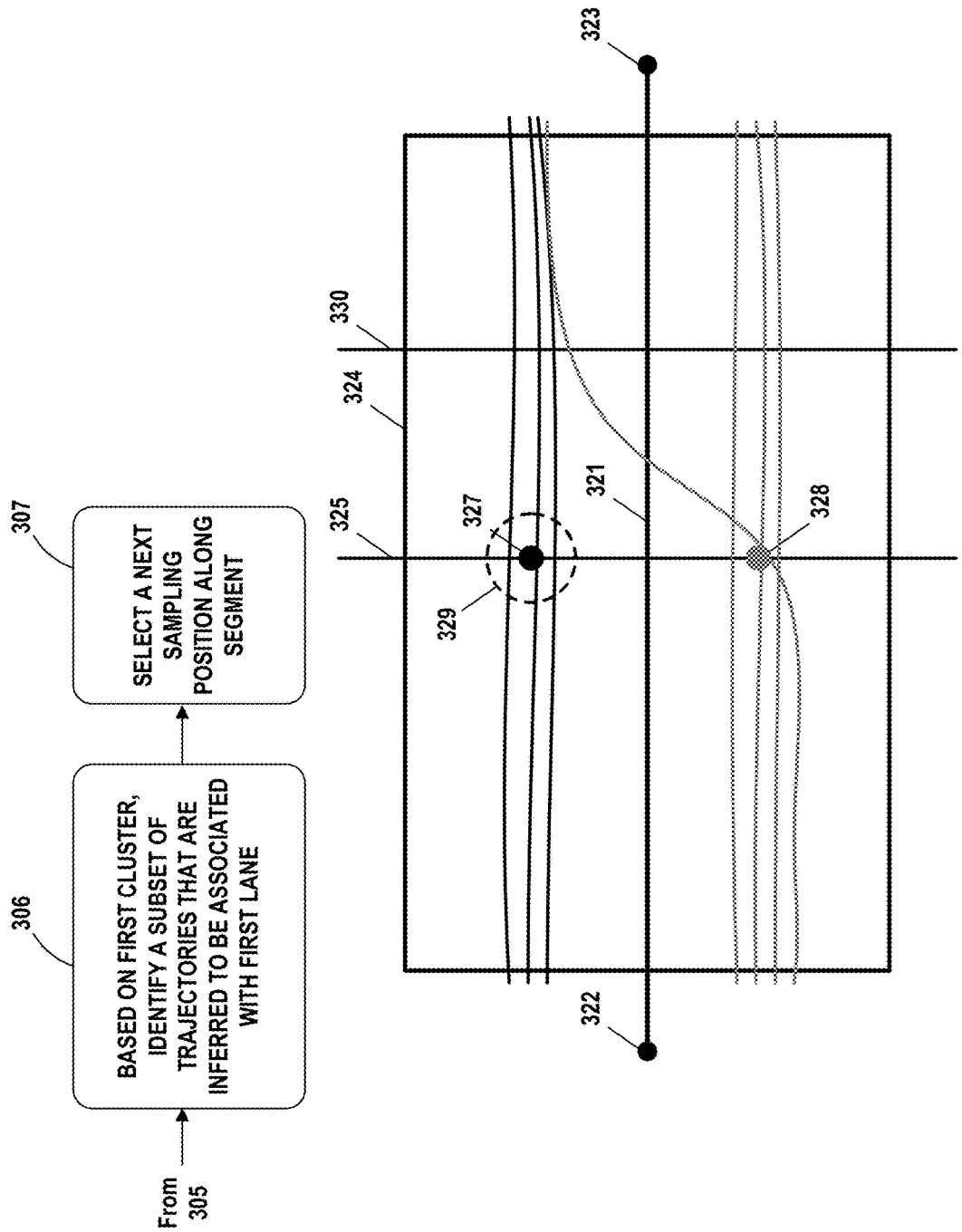
FIG. 3G is a diagram that illustrates another example function that may be carried out as part of an example pipeline that functions to generate geospatial lane data for a segment of a road network in accordance with the present disclosure.

Turning to FIG. 3G, at block 307, the example pipeline may select a next (or "second") sampling position along the given segment, which may be represented in terms of a line that is perpendicular to the given segment and intersects the given segment at a second reference point. In this respect, the second reference point may comprise any of various points along the given segment. For instance, as one example, the second reference point may be a point located within a predefined distance of the first sampling point along either direction of the given segment (e.g., 5 meters). As another example, the second reference point may be a point that is determined based on one or more characteristics of the given segment (e.g., length, shape, proximity of endpoints, etc.). As another example, the second reference point may be a point that is determined based on data defining the identified subset of trajectories that are inferred to be associated with the first lane between the first sampling position and the next sampling position. The second reference point may comprise other points along the given segment as well.

One possible example of the function of selecting a next sampling position along the given segment is illustrated in FIG. 3G. As shown in FIG. 3G, a second sampling position 330 has been selected along the segment 321, and this second sampling position 330 is defined by a perpendicular line that intersects the segment 321 at a second reference point. In this illustration, the second sampling position 330 intersects the segment 321 at a distance from the first sampling position 325.

The function of selecting a next sampling position along the given segment may take various other forms as well. Further, in practice, it should be understood that the second sampling position that is selected for the first lane could either be the same as or different than the second sampling position that is selected for the other lane(s).

Figure 3H:
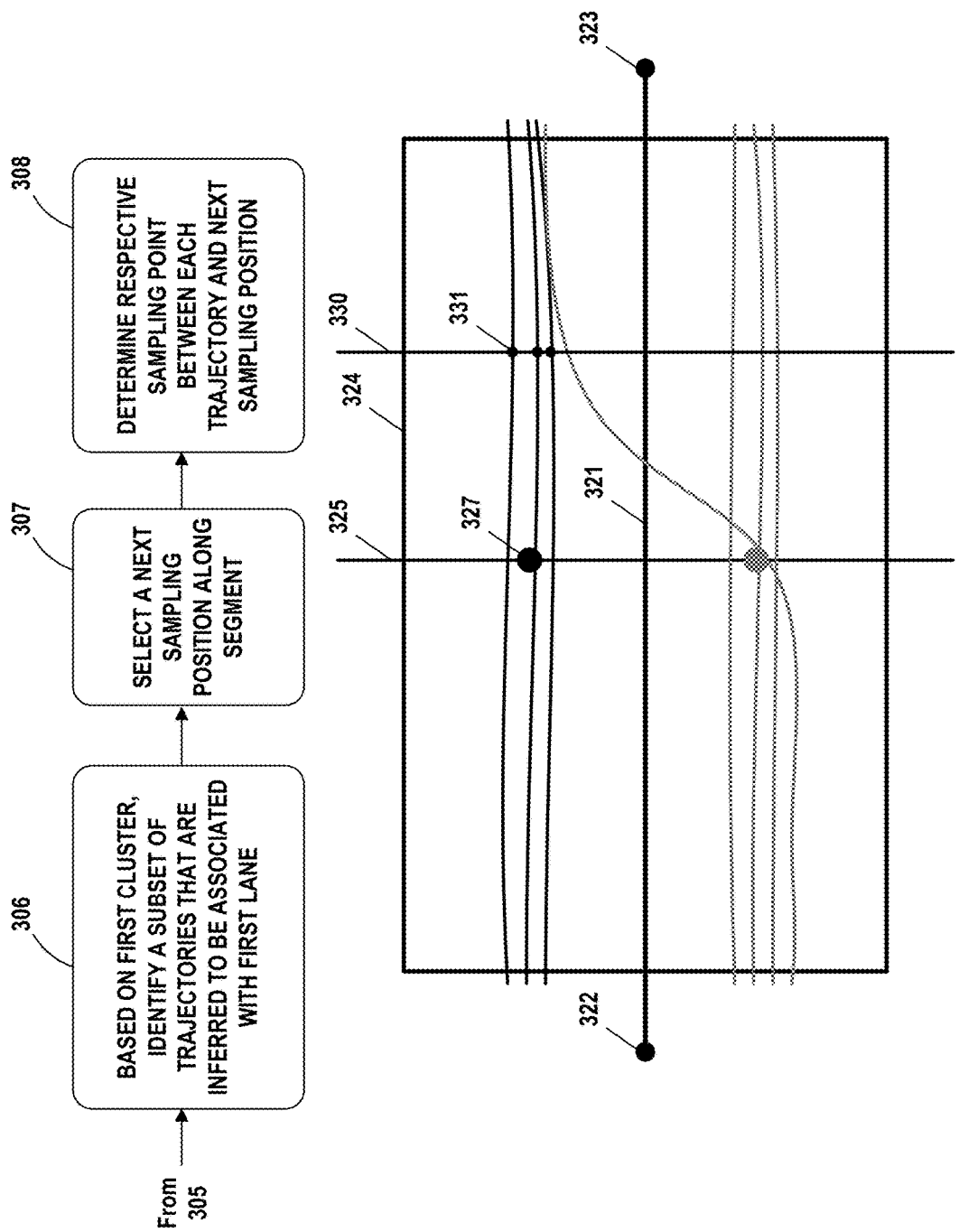
FIG. 3H is a diagram that illustrates another example function that may be carried out as part of an example pipeline that functions to generate geospatial lane data for a segment of a road network in accordance with the present disclosure.

Turning to FIG. 3H, at block 308, the example pipeline may determine a respective sampling point for each trajectory in the identified subset that represents the intersection between the trajectory and the second sampling position. This function of determining a respective sampling point for each trajectory in the identified subset may take various forms, which may depend on the form of the data defining each identified trajectory.

For instance, if the obtained data defining a trajectory in the identified subset takes the form of a fitted line, the function may simply involve determining a sampling point that represents the intersection between the trajectory and the second sampling position. On the other hand, if the obtained data defining a trajectory in the identified subset takes the form of a time-sequence of pose values, the function may involve (i) fitting a line to the time-sequence of pose values for the trajectory in the identified subset and (ii) determining a sampling point that represents the intersection between the fitted line and the second sampling position.

One possible example of determining a respective sampling point for each trajectory in the identified subset that represents the intersection between the trajectory and the second sampling position is illustrated in FIG. 3H. As shown in FIG. 3H, a respective sampling point has been determined for each trajectory in the identified subset that represents the intersection between the trajectory and the second sampling position 330, of which sampling point 331 is an example.

The function of determining a respective sampling point for each trajectory in the identified subset that represents the intersection between the trajectory the next sampling position may take other forms as well.

Figure 3I:
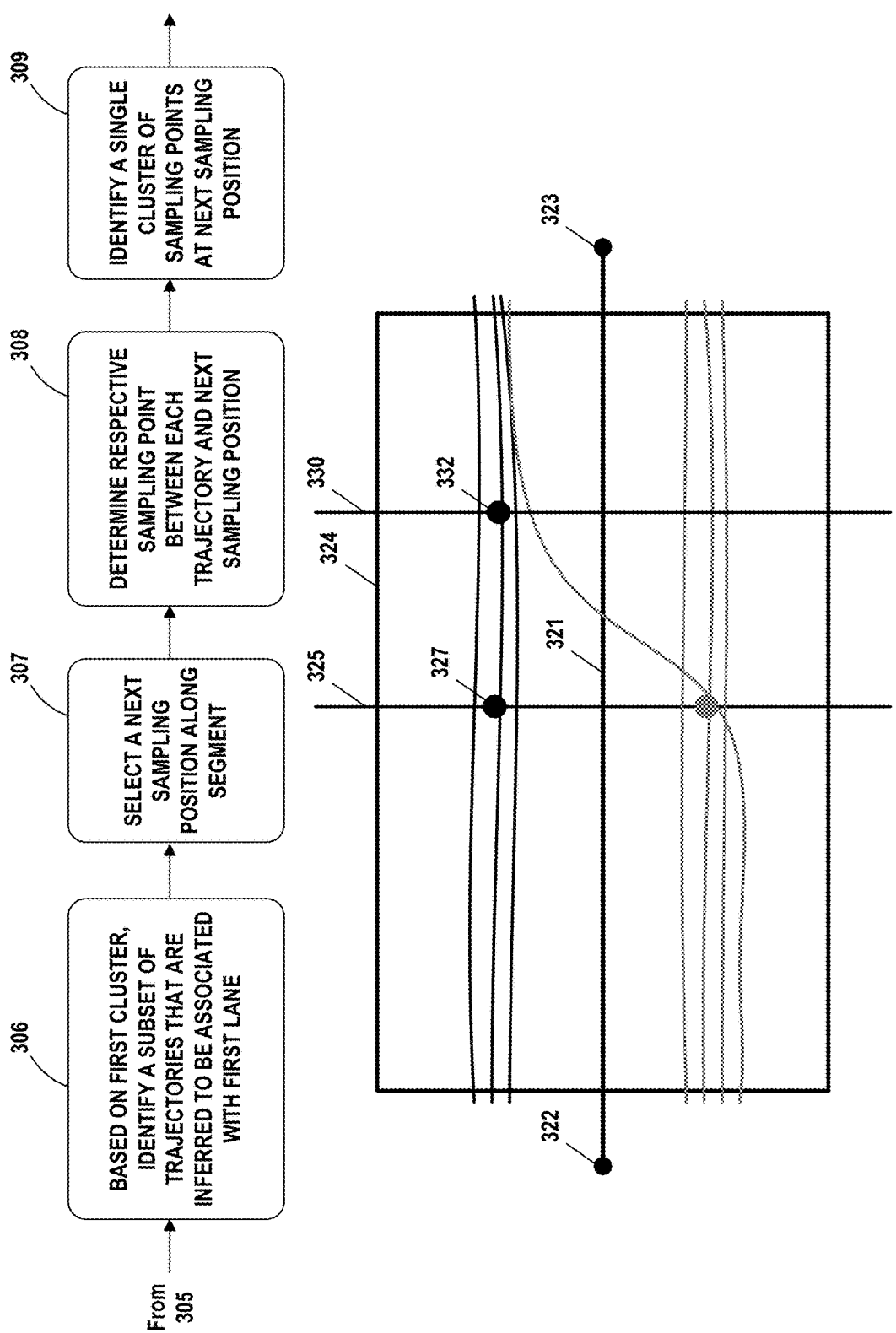
FIG. 3I is a diagram that illustrates another example function that may be carried out as part of an example pipeline that functions to generate geospatial lane data for a segment of a road network in accordance with the present disclosure.

Turning to FIG. 3I, at block 309, the example pipeline may identify a single cluster of the sampling points at the second sampling position, which may involve identifying a reference point such as a centroid for the single cluster of the sampling points at the second sampling position. The function of identifying a centroid for the single cluster of the sampling points at the second sampling position may take various forms. As one example, the function may involve (i) calculating a robust average of the sampling points along the second sampling position, and (ii) using the robust average as the centroid for the single cluster of the sampling points at the second sampling position.

As another example, the function may involve (i) calculating a weighted average of the sampling points at the second sampling position, and (ii) using the weighted average as the centroid for the single cluster of the sampling points at the second sampling position. In this example, the sampling points within the single cluster may be weighted based on various criteria. For instance, as one implementation, a respective weight may be assigned to each sampling point based on a confidence level associated with the sampling point's corresponding trajectory, which may have previously been determined based on based on factors such as the particular type(s) of sensor data used to derive the trajectory and/or the particular technique used to derive the trajectory, among other possibilities. In this respect, it may be the case that (i) trajectories derived using 3D sensor data (e.g., perhaps in combination with 2D image data and/or telematics data) will be associated with a higher confidence level, in which case the sampling points of such trajectories may be assigned a higher weight, (ii) trajectories derived using 2D image data (e.g., perhaps in combination with telematics data) will be associated with an intermediate confidence level, in which case the sampling points of such trajectories may be assigned an intermediate weight, and (iii) trajectories derived using telematics data alone will be associated with a lower confidence level, in which case the sampling points of such trajectories may be assigned a lower weight. However, the confidence level associated with the trajectories, and the corresponding weights assigned to the sampling points, may take various other forms as well. Further, criteria other than the confidence levels associated with the trajectories may also be used to assign weights to the sampling points. The function of identifying a reference point for the single cluster of sampling points at the second sampling position may take other forms as well—including but not limited to the possibility that the reference point may be something other than a centroid for a cluster One possible example of the function of identifying a single cluster of sampling points at the next sampling position is illustrated in FIG. 3I. As shown in FIG. 3I, a centroid 332 for a single cluster has been identified at the next sampling position 330, which may serve as another reference point to use for defining the geometry of the first lane.

The function of identifying a single cluster of sampling points at the second sampling position may take various other forms.

After the example pipeline identifies the cluster of sampling points at the second sampling position, the example pipeline may then repeat the functions of blocks 306 to 309 for one or more additional sampling positions in order to identify one or more additional clusters of sampling points along the given segment, which in turn are used to define the geometry of the first lane.

Specifically, for each additional sampling position, the example pipeline may function to (i) use the position of the identified cluster at a given sampling position (e.g., the centroid 332 at the sample position 330) as a basis for identifying a next subset of trajectories that are inferred to be associated with the first lane between the given sampling position and a next sampling position (e.g., trajectories that pass through an area that surrounds the centroid 332 at the sampling position 330), (ii) select the next sampling position (e.g., a third sampling position that aligns with the lengthwise boundary 324A on the righthand side of the area of interest 324) for which to identify a cluster, (iii) determine a respective sampling point for each trajectory in the next subset that represents the intersection between the trajectory and the next sampling position, and then (iv) identify a single cluster of sampling points at the next sampling position, which may also be used to define the geometry of the first lane.

In this respect, it should be understood that the particular subset of derived vehicle trajectories that is identified as being associated with the first lane between each different pair of adjacent sampling positions along the given segment could change, which reflects the fact that some vehicles could have changed lanes as they traveled along the road segment. For example, a first subset of derived vehicle trajectories identified as being associated with the first lane between the first and second sampling positions along the given segment may include one or more derived vehicle trajectories that are not included in a second subset of derived vehicle trajectories identified as being associated with the first lane between the second and third sampling positions along the given segment, which may be case if one or more vehicles moved out of the first lane between the first and second sampling positions along the given segment. As another example, the second subset of derived vehicle trajectories identified as being associated with the first lane between the second and third sampling positions along the given segment may include one or more derived vehicle trajectories that are not included in the first subset of derived vehicle trajectories identified as being associated with the first lane between the first and second sampling positions along the given segment, which may be case if one or more vehicles moved into the first lane between the first and second sampling positions along the given segment. Other examples are possible as well.

Figure 3J:
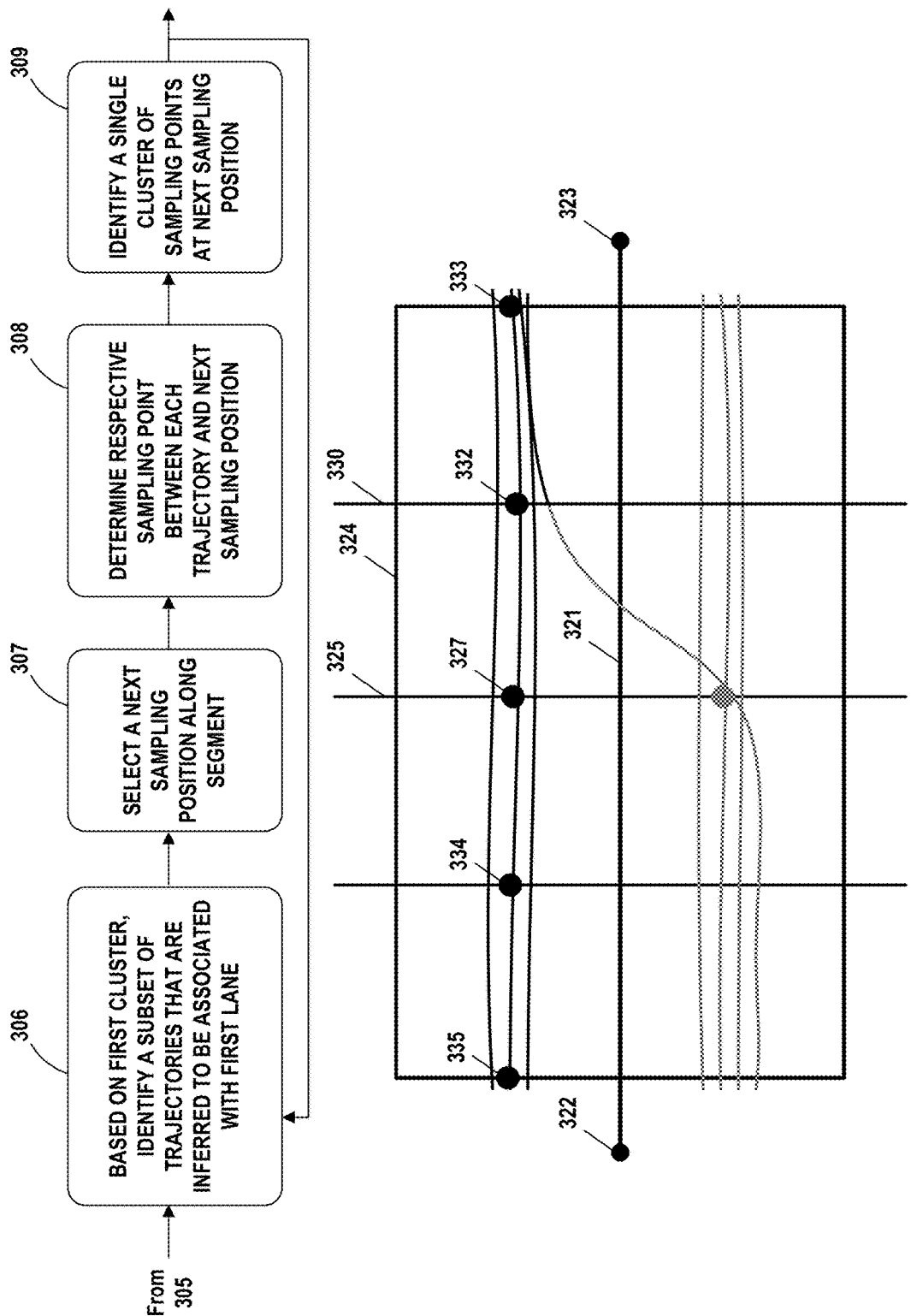
FIG. 3J is a diagram that illustrates another example function that may be carried out as part of an example pipeline that functions to generate geospatial lane data for a segment of a road network in accordance with the present disclosure.

One possible example of the example pipeline repeating the functions of blocks 306 to 309 for one or more additional sampling positions is illustrated in FIG. 3J. As shown in FIG. 3J, the example pipeline has identified new centroids 333, 334, and 335 at three other sampling positions that fall on both sides of the sampling position 325, each of which may serve as another centroid to use for defining the geometry of the first lane. Further, as shown, the trajectories that were included in the identified subset between each pair of adjacent sampling positions are shown in black (including part of a trajectory included in the identified subset between centroids 332 and 333), while the trajectories that were not included in the identified subset are shown in gray. While three additional clusters are illustrated in FIG. 3J, it should also be understood that the functions of blocks 306 to 309 may be repeated more or less times in order to identify additional clusters along the given segment in connection with the first lane.

Further, in line with the discussion above, it should be understood that the subsequent sampling positions that are selected for the first lane could either be the same as or different than the subsequent sampling positions that are selected for the other lane(s).

After identifying each cluster that is associated with the first lane at each of the different sampling positions along the given segment, the example pipeline may then use the identified clusters to define the geometry of the first lane. For instance, turning to FIG. 3K and block 310, the example pipeline may first use the identified clusters to define a centerline of the first lane. This function may take various forms.

As one possibility, the function of using the identified clusters to define a centerline of the first lane may involve fitting a line to the centroids of the identified clusters and then defining that fitted line to be the centerline of the first lane. The function of fitting a line to the centroids of the identified clusters may take various forms, one example of which may involve applying a Kalman filter to the centroids, among other possibilities.

Figure 3K:
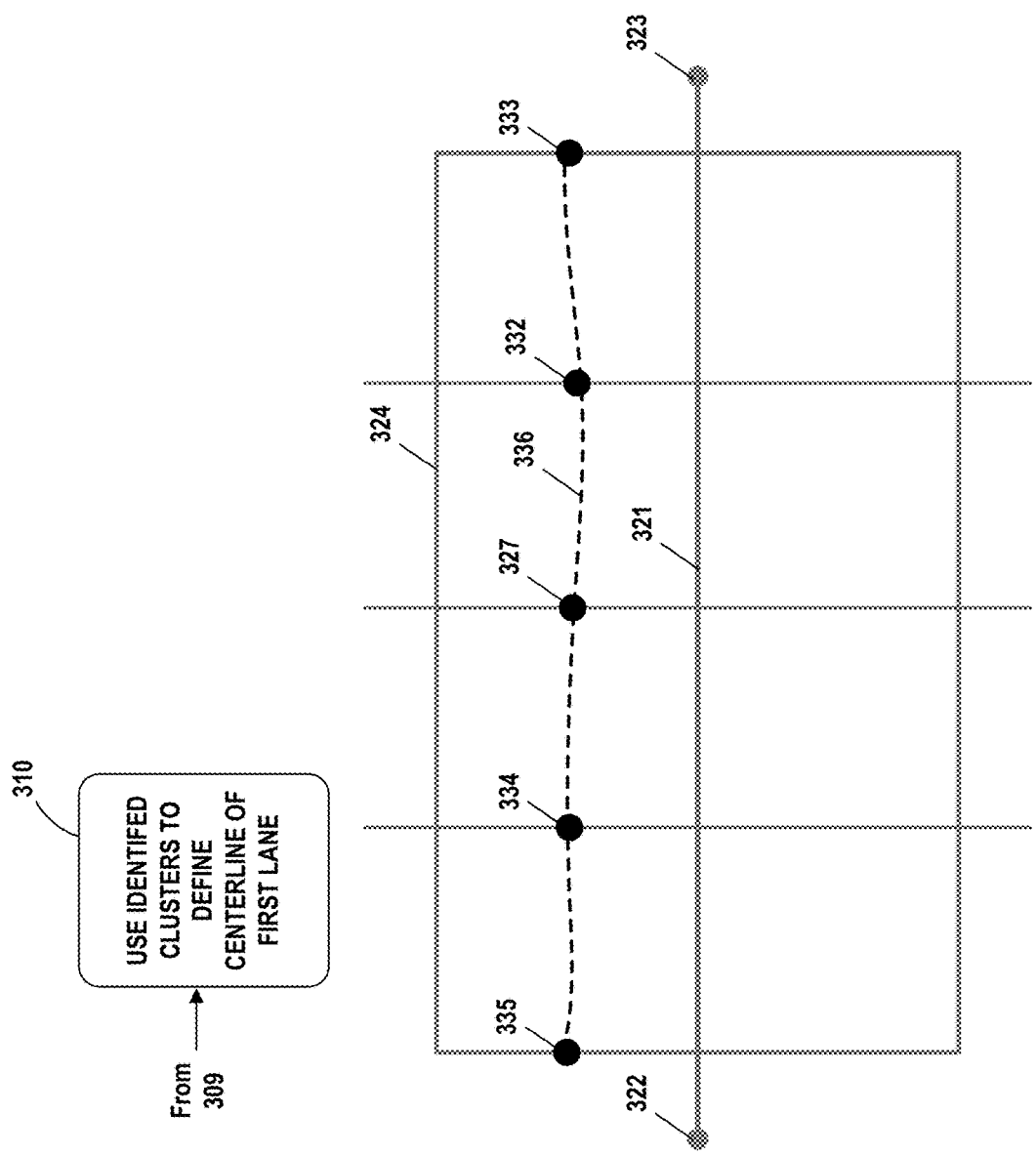
FIG. 3K is a diagram that illustrates another example function that may be carried out as part of an example pipeline that functions to generate geospatial lane data for a segment of a road network in accordance with the present disclosure.

One possible example of the function of using the identified clusters to define a centerline of the first lane is illustrated in FIG. 3K. As shown in FIG. 3K, the example pipeline has fit a line 336 to the centroids 327, 332, 333, 334, and 335 that were previously identified for the first lane, and this fitted line 336 may then be defined as the centerline of the first lane.

The function of using the identified clusters to define a centerline of the first lane may take other forms as well.

Figure 3L:
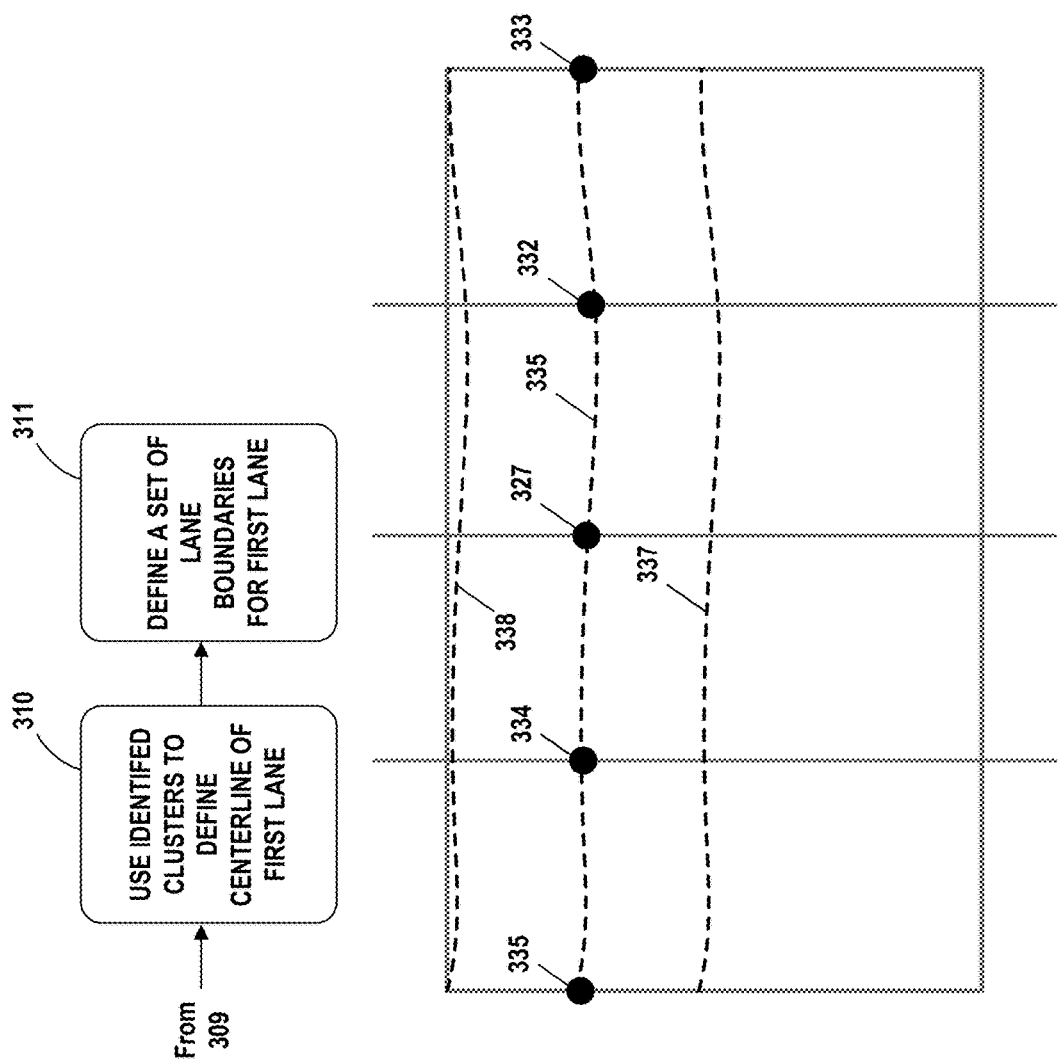
FIG. 3L is a diagram that illustrates another example function that may be carried out as part of an example pipeline that functions to generate geospatial lane data for a segment of a road network in accordance with the present disclosure.

Turning to FIG. 3L, at block 311, the example pipeline may next define a set of lane boundaries for the first lane, which may be represented as a set of geospatial position information. In practice, this set of lane boundaries for the first lane may comprise a pair of lateral lane boundaries for the first lane and a pair of longitudinal lane boundaries for the first lane. Such lateral and longitudinal lane boundaries for the first lane may be defined in various ways.

For instance, in one implementation, the function of defining a pair of lateral lane boundaries for the first lane may involve defining a lane boundary on each side of the defined centerline of the first lane that mirrors the shape of the centerline and is a given distance from the centerline. In this respect, the given distance that is used to define the lateral lane boundary on each side of the centerline may either be a predefined distance (e.g., a distance between 1.5 and 2 meters) or a distance that is determined based on a number of factors, such as the real-world environment in which the road exists, among other factors.

In another implementation, the function of defining the pair of lateral lane boundaries for the first lane may involve defining a lateral lane boundary that falls between two adjacent lanes based on the derived centerlines for the two adjacent lanes. In this respect, before defining the lateral lane boundary, the example pipeline may derive a centerline for an adjacent lane in the same manner described above (e.g., by carrying out functions 306-310 for the adjacent lane). In turn, the example pipeline may define a lateral lane boundary that falls between two adjacent lanes in any of various ways.

As one possibility, the function of defining a lateral lane boundary that falls between two adjacent may begin with a selection a set of reference points along each of the derived centerlines for the two adjacent lanes. This section may take various forms. For instance, in one example approach, the example pipeline may uniformly select reference points (e.g., every 5 meters) along each of the derived centerlines for the two adjacent lanes. In another example approach, the example pipeline may select reference points along each of the derived centerlines for the two adjacent lanes based on characteristics of each of the two lanes (e.g., curvature, the real-world environment in which it exists, etc.). The example pipeline may select a set of reference points along each of the derived centerlines for the two adjacent lanes in other ways as well. The example pipeline may then determine a midway point for each respective pair of reference points along each of the derived centerlines. The example pipeline may then fit a line to the determined midway points, which in turn represents the lane boundary that falls between the two adjacent lanes.

As another possibility, the function of defining a lateral lane boundary that falls between two adjacent may involve the use of a technique that accepts the derived centerlines for the two adjacent lines as input and in turn outputs a line that is representative of the lane boundary that falls between the two adjacent lanes.

The example pipeline may define a lane boundary that falls between two adjacent lines in other ways as well.

In yet another implementation, the function of defining the pair of lateral lane boundaries for the first lane may additionally involve the use of other data (e.g., sensor data) to validate the defined pair of lateral lane boundaries for the first lane. For instance, a pair of lateral boundaries may initially be derived using one of the techniques described above, where such lane boundaries may comprise an initial set of geospatial position information for the first lane, and such lateral lane boundaries may then be validated by (i) accessing image data that is associated with the initial set of geospatial position information for the lateral boundaries of the first lane (ii) detecting objects that are indicative of lane boundaries with the image data, (iii) determining geospatial position information for the detected objects, and (iv) using the determine geospatial position information for the detected objects to update the initial set of geospatial position information for the lane, which in turn may redefine the pair of lateral boundaries for the lane.

The function of defining a pair of lateral lane boundaries for the first lane may take other forms as well—including but not limited to the possibility that the image data may be used to define the lateral lane boundaries in the first instance.

As noted above, the function of defining a set of lane boundaries for the first lane may also involve defining a pair of longitudinal lane boundaries of the first lane. This function may take various forms. For instance, as one example, the function may involve defining a pair of lines that connect respective ends of the defined pair of lateral lane boundaries along each longitudinal boundary of the defined area around the given segment. The function of defining a pair of longitudinal lane boundaries of the first lane may take other forms as well.

One possible example of the function of defining lane boundaries of the first lane is illustrated in FIG. 3L. As shown in FIG. 3L, lane boundaries 337 and 338 have been defined for the first lane at a fixed distance on each side of the centerline 335.

The function of defining the set of lane boundaries for the first lane may take other forms as well.

The example pipeline performing functions described with respect to FIGS. 3A-3L may result in generated geospatial lane data for the first lane. It should be understood that these functions can be also repeated (e.g., in parallel and/or in series) for each other lane that is inferred based on the clusters identified at the first sampling position, in order to generate geospatial lane data for each of these other lanes.

In some circumstances, the example pipeline may also optionally perform certain validation functions on the geospatial lane data that is generated for the given segment. These validation functions may take various forms.

As one possibility, the validation functions performed by the example pipeline may involve an evaluation of whether the generated geospatial lane data indicates that two adjacent lanes begin to overlap with one another. The example pipeline may detect such an overlap by determining whether the two adjacent lanes are closer than a certain threshold (e.g., 50 centimeters). If the example pipeline determines that the two adjacent lanes are closer than the threshold, the example pipeline may then take any of various actions to address the detected overlap. For instance, as one possibility, the example pipeline may remove one of two overlapping lanes based on some criteria (e.g., removing the more curved lane of the two lanes, etc.). As another possibility, the example pipeline may flag the given segment for re-evaluation as more trajectories become available for the defined area. The example pipeline may take other actions to address the detected overlap as well.

The validation functions that may optionally be performed by the example pipeline, as well as the actions taken in response to detecting an issue with the geospatial lane data that is generated for a given segment, may take various other forms as well.

Figure 3M:
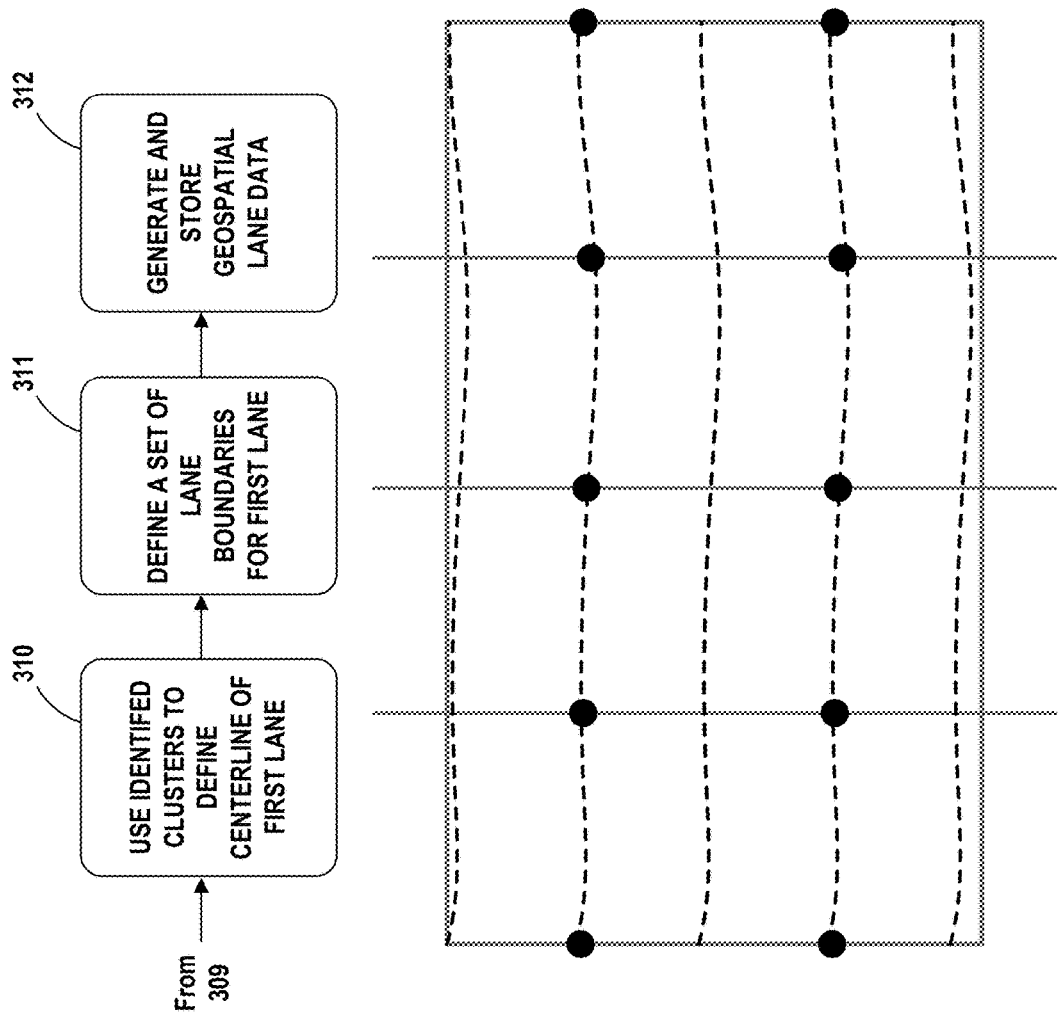
FIG. 3M is a diagram that illustrates another example function that may be carried out as part of an example pipeline that functions to generate geospatial lane data for a segment of a road network in accordance with the present disclosure.

Turning to FIG. 3M, at block 312, the example pipeline may generate and store the geospatial lane data for the given segment. In this respect, the geospatial lane data that is stored for the given segment may take various forms.

For instance, as one possibility, the geospatial lane data that is stored for the given segment may include a lane identifier for each lane of the segment, which may take various forms. As one example, the lane identifier may be a unique set of one or more alphanumeric characters. In this respect, each lane has a respective lane identifier that can be used to reference each lane when used for various applications. The lane identifier may take other forms as well.

Further, the geospatial lane data that is stored for the given segment may include a segment identifier for each lane of the segment that indicates the segment for which the lane was generated. The segment identifier may take various forms, including the forms described with respect to the lane identifier. The segment identifier may take other forms as well.

Further yet, the geospatial lane data that is stored for the given segment may include data defining a geometry of each lane of the segment. The data defining the geometry of each lane of the segment may take various forms. For instance, as one example, the data defining the geometry of each lane of the segment may comprise a set of coordinates that define the boundaries of the lane. In this respect, the set of coordinates may include four subsets of coordinates, each of which define one boundary of the lane. As another example, the data defining the geometry of each lane of the segment may be a representation of a set of lines that define the boundaries of the lane. In some implementations, the data defining the geometry of the lane may also include data defining the derived centerline of the lane. The data defining the geometry of each lane of the segment may take other forms as well. The geospatial lane data may take other forms as well.

One possible example of the function of generating the geospatial lane data, which can then be stored, is illustrated in FIG. 3M. As shown in FIG. 3M, geospatial lane data has been generated for two lanes associated with the given segment, which can then be subsequently stored.

It should be understood that FIGS. 3A-3M merely illustrate one possible implementation of the disclosed technique for generating geospatial lane data for a segment of a road network, and that the disclosed technique may be implemented in various other manners, including the possibility that illustrated functions may be added, removed, rearranged into different orders, combined into fewer functions, and/or separated into additional functions, depending upon the particular implementation.

As noted above in connection with FIG. 2 above, the example pipeline may also function to generate geospatial lane data for each node in the road network. One example of a pipeline that functions to generate geospatial lane data for a given node of a road network in accordance with the present disclosure will now be described with reference to FIGS. 4A-4F.

Turning to FIG. 4A, at block 401, the example pipeline may begin by identifying all segment lanes that intersect a given node. In this respect, the function of identifying all segment lanes that intersect a given node may take various forms.

For instance, as one possibility, the example pipeline may first identify the given node. The example pipeline may then identify one or more segments that intersect the given node. This function of identifying one or more segments that intersect the given node may take various forms. For instance, as one example, the function may involve determining one or more segment identifiers that are associated with segments for which the given node serves as an endpoint. The function of identifying one or more segments that intersect the given node may take other forms as well. The example pipeline may then obtain geospatial lane data for each of the identified one or more segments that intersect the given node. The geospatial lane data may take various forms. For instance, as one example, the geospatial lane data may take the form described above with respect to FIG. 3M. The geospatial lane data may take other forms as well.

The function of identifying all segment lanes that intersect a given node may take other forms as well.

One possible example of the function of identifying all segment lanes that intersect a given node is illustrated in FIG. 4A. As shown in FIG. 4A, segment lanes 411, 412, 413, 414, 415, and 416 have been identified as intersecting with a node 410. Further, as shown, each identified segment lane has been assigned a lane identifier. Specifically, segment lane 411 has been assigned a lane identifier of "A," segment lane 412 has been assigned a lane identifier of "B," lane 413 has been assigned a lane identifier of "C," segment lane 414 has been assigned a lane identifier of "D," segment lane 415 has been assigned a lane identifier of "E," and segment lane 416 has been assigned a lane identifier of "F." Further, it should be understood that the lane identifiers shown in FIG. 4A are for illustrative purposes only, as the lane identifiers may take other forms as described above with respect to FIG. 3M.

Figure 4B:
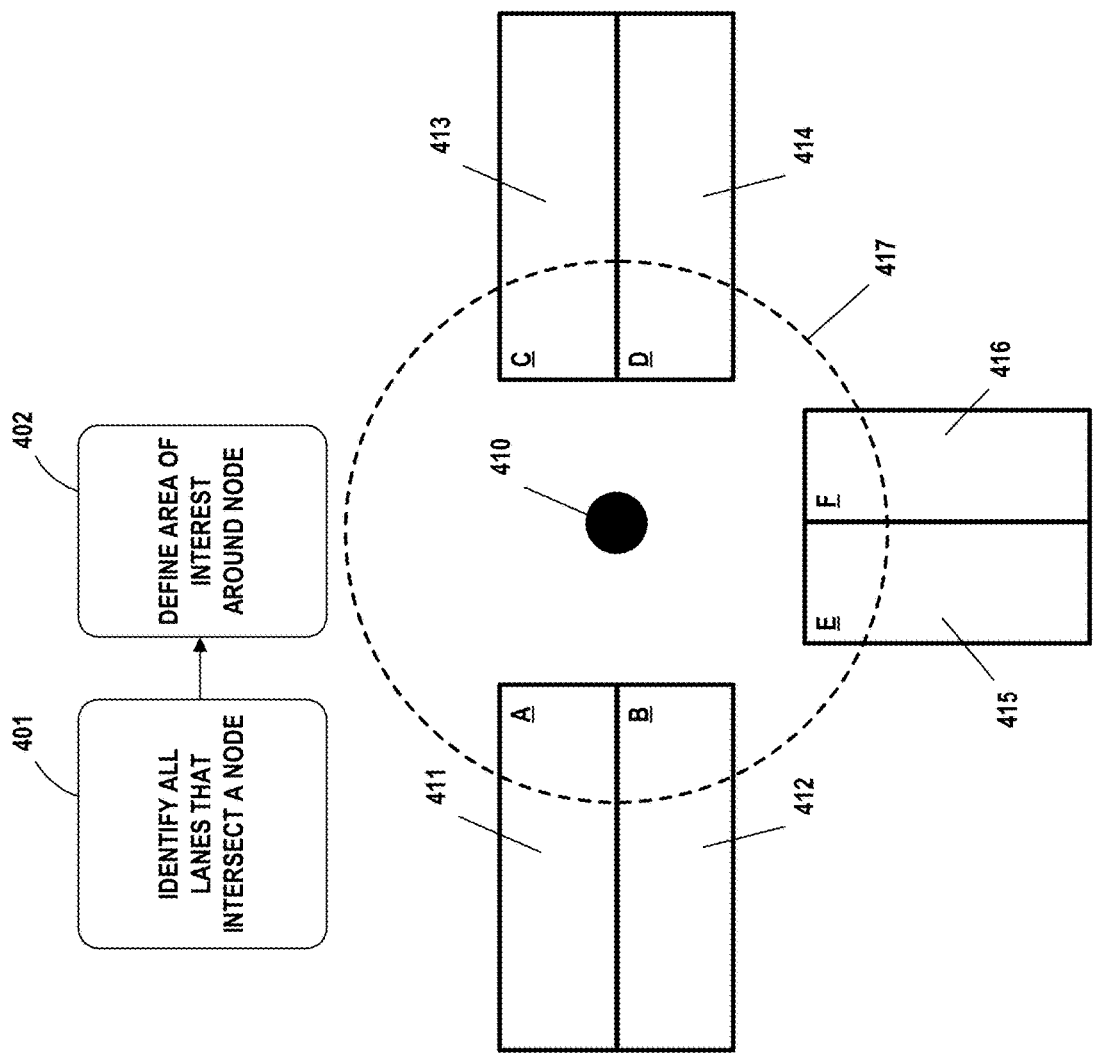
FIG. 4B is a diagram that illustrates another example function that may be carried out as part of an example pipeline that functions to generate geospatial lane data for a node of a road network in accordance with the present disclosure.

Turning to FIG. 4B, at block 402, the example pipeline may define an area of interest around the given node. This function may take various forms.

For instance, as one possibility, the example pipeline may define a circular area that is centered at the given node and has a radius of a given length, which may take various forms. For instance, as one implementation, the length of the radius may be a predetermined value (e.g., 20 meters). As another implementation, the length of the radius may be based on one or more characteristics of the given node or the intersecting lanes (e.g., the distance between the given node and the closest boundary of each intersecting lane). The length of the radius of the defined area may take other forms as well. Further, in practice, the circular area will preferably have a radius that is long enough to partially overlap with the intersecting lanes.

One possible example of the function of defining an area of interest around the given node is illustrated in FIG. 4B. As shown in FIG. 4B, an area of interest 417 is defined around the node 410 such that it partially overlaps the identified segment lanes 411, 412, 413, 414, 415, and 416.

The function of defining an area of interest around the given node may take other forms as well.

Figure 4C:
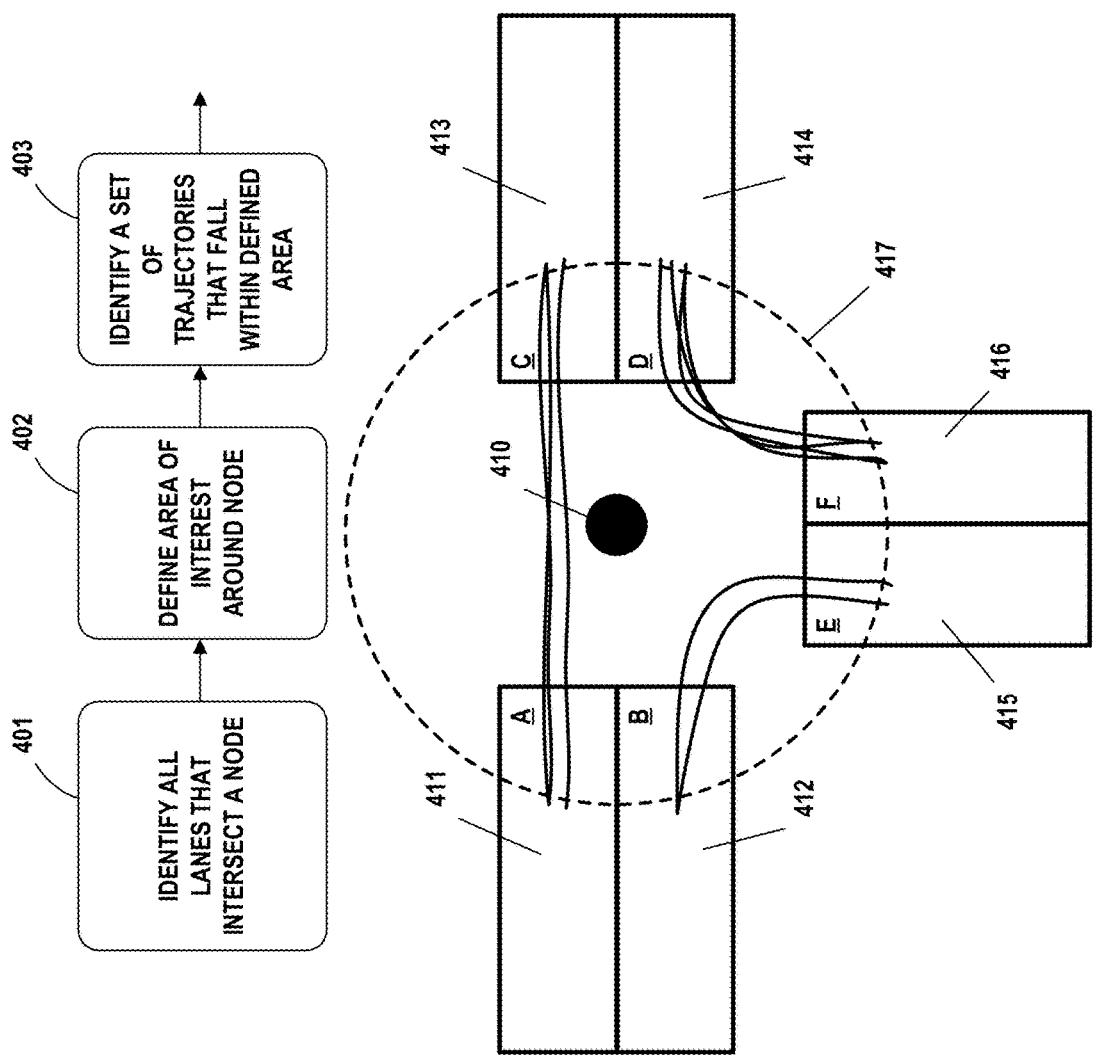
FIG. 4C is a diagram that illustrates another example function that may be carried out as part of an example pipeline that functions to generate geospatial lane data for a node of a road network in accordance with the present disclosure.

Turning to FIG. 4C, at block 403, the example pipeline may identify a set of derived vehicle trajectories that fall within the defined area of interest. The example pipeline may identify a set of derived vehicle trajectories that fall within the defined area of interest in various ways.

As one possibility, the example pipeline may identify a set of derived vehicle trajectories that fall within the defined area of interest in a manner that is similar to that described above with respect to FIG. 3B. Specifically, in line with the discussion above, identifying the set of derived vehicle trajectories that fall within the defined area may involve (i) querying a repository of available, previously-derived trajectories to identify a set of derived vehicle trajectories that fall within the defined area of interest around the given node, and (ii) obtaining data defining each of the identified previously-derived trajectories.

One possible example of the function of identifying a set of derived vehicle trajectories that fall within the defined area of interest is illustrated in FIG. 4C. As shown in FIG. 4C, a set of derived vehicle trajectories have been identified as falling within the area of interest 417, and data defining this set of derived vehicle trajectories has been obtained. In this respect, while the obtained data defining each identified trajectory may take the form of a time-sequence of pose values, the data defining each identified trajectory is shown in FIG. 4C as a line that has been fitted to the time-sequence of pose values that define the trajectory. Further, the fitted line for each identified trajectory is shown to extend beyond the boundary of the defined area of interest 417, which reflects that the obtained data defining each identified trajectory includes pose values beyond the boundary of the defined area of interest 417.

The function of identifying a set of derived vehicle trajectories that fall within the defined area of interest may take other forms as well.

Figure 4D:
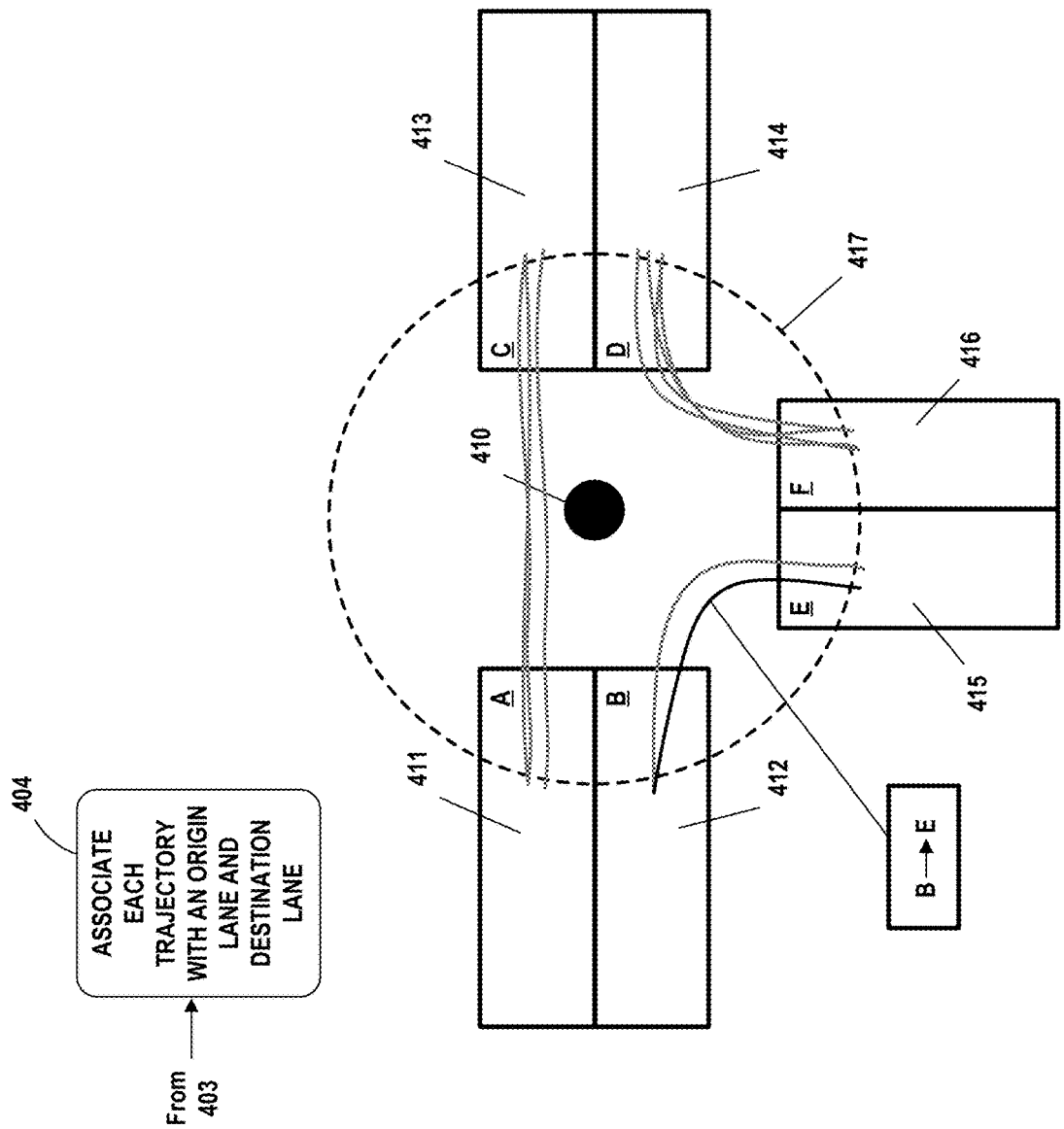
FIG. 4D is a diagram that illustrates another example function that may be carried out as part of an example pipeline that functions to generate geospatial lane data for a node of a road network in accordance with the present disclosure.

Turning to FIG. 4D, at block 404, the example pipeline may associate each trajectory in the set of derived vehicle trajectories that fall within the defined area with an origin lane and a destination lane, which may result in the creation of a respective data element for each trajectory in the identified set that identifies a pairwise combination of associated segment lanes for the trajectory. This function may take various forms.

As one possibility, the function of associating a trajectory in the identified set of derived vehicle trajectories with an origin lane and a destination lane may involve (i) comparing the trajectory to the obtained data defining the segment lanes that intersect the given node, (ii) based on the comparing, identifying a first segment lane that has the greatest extent of overlap with the trajectory on a first end of the trajectory and a second segment lane that has the greatest extent of overlap with the trajectory on a second end of the trajectory (e.g., by determining which segment lane contains the greatest number of pose values on each end of the trajectory), (iii) designating one of the first and second segment lanes as an origin lane for the trajectory and the other of the first and second segment lanes as the destination lane for the trajectory (e.g., by inferring the sequence of the two segment lanes based on the timing information associated with the trajectory), and then (iv) creating a data element that identifies the first and second segment lanes as the pairwise combination of associated segment lanes for the trajectory, which may comprise an ordered sequence of segment lane identifiers.

Notably, each pairwise combination of associated segment lanes that is identified for a trajectory in the identified set in this manner may provide one indication that a "connection" exists between that pairwise combination of associated segment lanes in the real world.

One possible example of the function of associating each trajectory in the set of derived vehicle trajectories that fall within the defined area with an origin lane and a destination lane is illustrated in FIG. 4D. As shown in FIG. 4D, the example pipeline has determined that a given trajectory (shown in black) is associated with the segment lane 412 that has the lane identifier "B" and the segment lane 415 that has the lane identifier "E," where the segment lane 412 is the origin lane and the segment lane 415 is the destination lane.

The function of associating each trajectory in the set of derived vehicle trajectories that fall within the defined area with an origin lane and a destination lane may take various other forms as well.

Figure 4E:
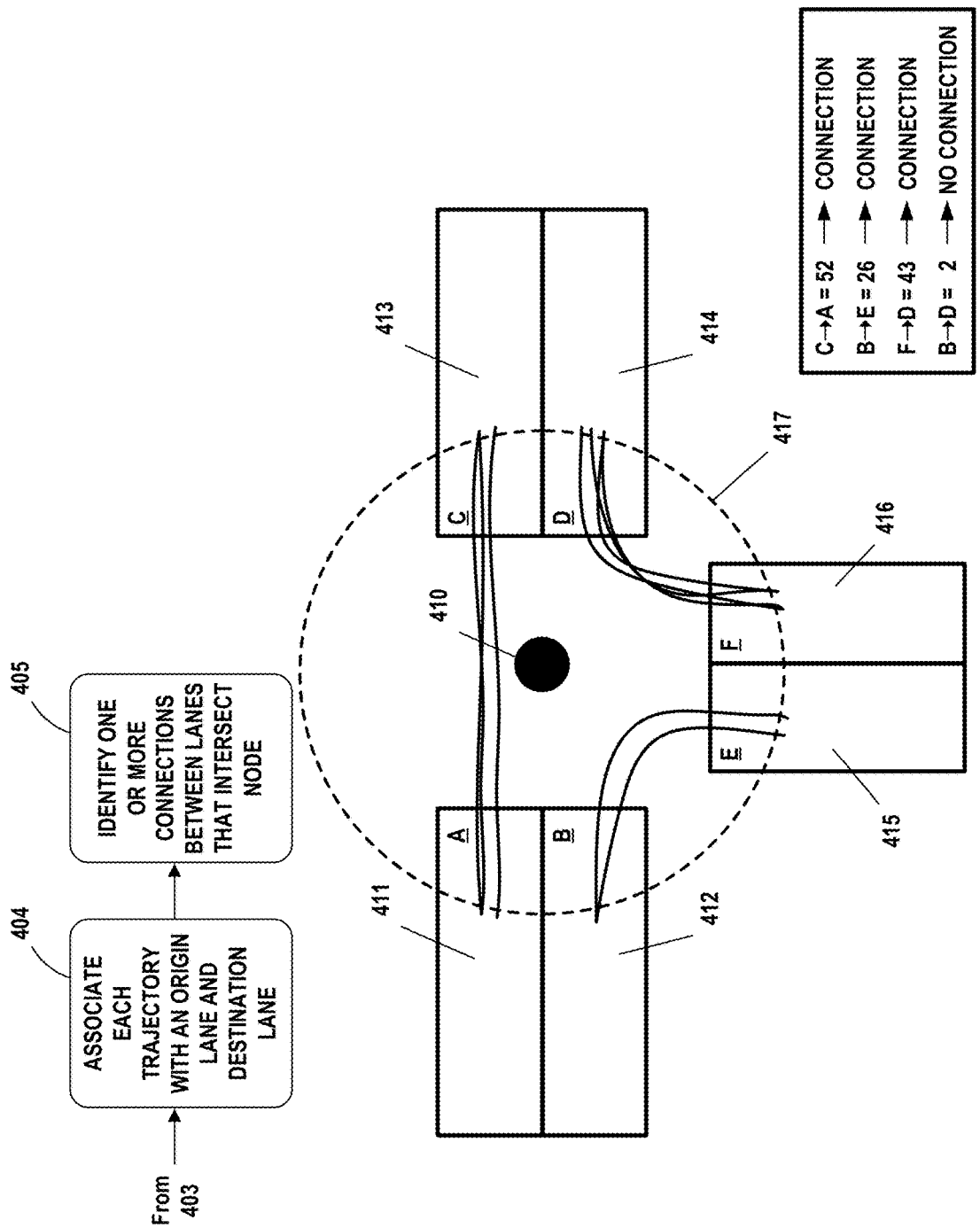
FIG. 4E is a diagram that illustrates another example function that may be carried out as part of an example pipeline that functions to generate geospatial lane data for a node of a road network in accordance with the present disclosure.

Turning to FIG. 4E, at block 405, the example pipeline may then perform an evaluation of the pairwise combinations of segment lanes across the trajectories in the identified set in order to identify one or more connections between the segment lanes that intersect the given node. This evaluation may take various forms.

As one possibility, the function of evaluating the pairwise combinations of segment lanes across the trajectories in the identified set may involve (i) determining a count of instances of each different pairwise combination of segment lanes that has been created for the trajectories in the identified set, (ii) comparing the determined count for each different pairwise combination of segment lanes to a threshold count in order to determine whether a pairwise combination of segment lanes has been seen a sufficient enough times to infer that a connection exists between the segment lanes, and then (iii) based on the comparing, determining that a connection exists between each pairwise combination of segment lanes having a determined count that exceeds the threshold.

One possible example of this approach for evaluating the pairwise combinations of segment lanes across the trajectories in the identified set is illustrated in FIG. 4E. As shown in FIG. 4E, the example pipeline has counted 52 instances of trajectories that extend from the "C" segment lane to the "A" segment lane, 26 instances of trajectories that extend from the "B" segment lane to the "E" segment lane, 43 instances of trajectories that extend from the "F" segment lane to the "D" segment lane, and two instances of trajectories that extend from the "B" segment lane to the "D" segment lane. Based on these determined counts, the example pipeline may then determine each of the pairwise combinations represents a connection between their respective segment lanes, except for the pairwise combination between the "B" segment lane and the "D" segment lane.

The function of evaluating the pairwise combinations of segment lanes across the trajectories in the identified set in order to identify one or more connections between the segment lanes that intersect the given node may take various other forms as well.

Figure 4F:
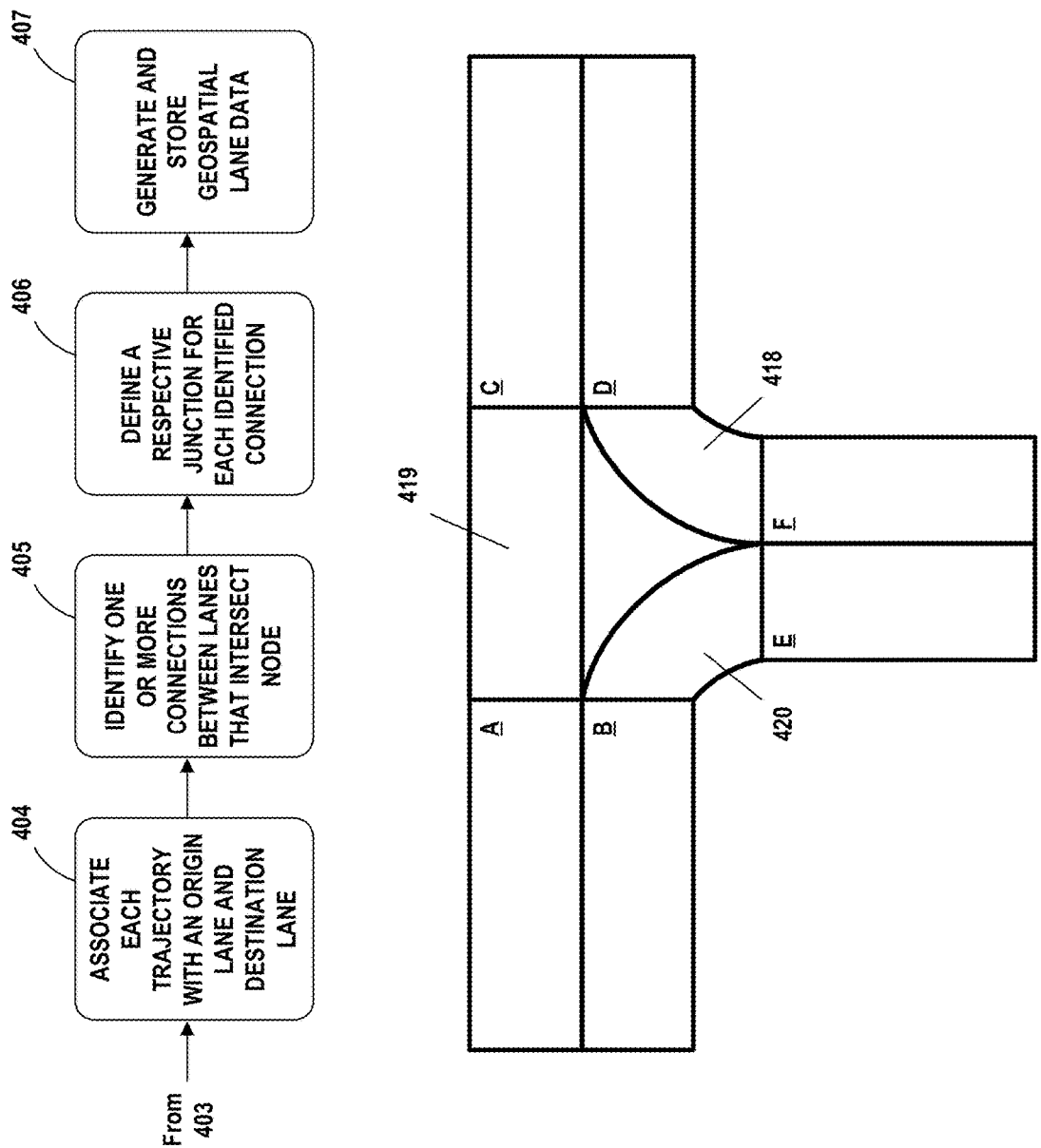
FIG. 4F is a diagram that illustrates another example function that may be carried out as part of an example pipeline that functions to generate geospatial lane data for a node of a road network in accordance with the present disclosure.

Turning to FIG. 4F, at block 406, the example pipeline may define a respective "junction" lane for each identified connection between segment lanes, which may involve determining a geometry of each such junction lane. This function may take various forms.

In one implementation, the function of determining the geometry of a junction lane for an identified connection between segment lanes may first involve determining the longitudinal boundaries for the junction lane. This function may take various forms. For instance, as one possibility, the function may involve (i) accessing data that defines the geometry of each segment lane that is part of the connection (e.g., data that defines the boundaries of the segment lanes), (ii) identifying the longitudinal boundary of each such segment lane that borders the connection, and (iii) adopting the identified longitudinal boundaries as the longitudinal boundaries for the junction lane. The function of determining the longitudinal boundaries for a junction lane may take other forms as well.

In turn, the function of determining the geometry of the junction lane for the identified connection between segment lanes may next involve determining the lateral boundaries for the junction lane. This function may also take various forms. For instance, as one possibility, the function may involve creating a pair of Bézier curves that connect the longitudinal boundaries of the junction at each of their endpoints. The function of determining the lateral boundaries for a junction lane may take other forms as well.

One possible example of the function of determining the geometry of junction lanes for identified connection between segment lanes is illustrated in FIG. 4F. As shown in FIG. 4F, the geometry of junction lanes 418, 419, and 420 have been determined.

The function of determining the geometry of a junction lane for each identified connection between segment lanes may take other forms as well.

In some circumstances, the example pipeline may optionally perform validation functions on the determined geometry of each junction lane for each identified connection between segment lanes, which may take various forms.

Referring again to FIG. 4F, at block 407, the example pipeline may generate and store the geospatial lane data for the given node.

The geospatial lane data for the given node may take various forms. For instance, as one possibility, the geospatial lane data that is stored for the given node may include (i) a lane identifier for each junction lane associated with the given node as well as (ii) a lane identifier for each origin lane and destination lane that was used in defining the junction lane. Such a lane identifier may take various forms. For instance, as one example, the lane identifier may be a unique set of one or more alphanumeric characters. In this respect, each junction lane and each origin and destination lane that was used in defining the junction lane has a respective lane identifier that can be used to reference each junction lane when used for various applications. The lane identifier may take other forms as well.

Further, the generated geospatial lane data for the given node may include a node identifier that indicates the node for which the lane was generated. The node identifier may take various forms, including the forms described with respect to the lane identifier. The node identifier may take other forms as well.

Further yet, the generated geospatial lane data for the given node may include data defining a geometry of each junction lane associated with the given node. The data defining the geometry of each junction lane associated with the given node may take various forms. For instance, as one example, the data defining the geometry of each junction lane may be a set of coordinates that define the boundaries of each junction lane. In this respect, the set of coordinates may include four subsets of coordinates, each of which define one boundary of the junction lane As another example, the data defining the geometry of each junction lane may be a representation of a set of lines that define the boundaries of the junction lane. The data defining the geometry of each junction lane associated with the given node may take other forms as well.

The geospatial lane data for the given node may take other forms as well.

It should be understood that FIGS. 4A-4F merely illustrate one possible implementation of the disclosed technique for generating geospatial lane data for a segment of a road network, and that the disclosed technique may be implemented in various other manners, including the possibility that illustrated functions may be added, removed, rearranged into different orders, combined into fewer functions, and/or separated into additional functions, depending upon the particular implementation.

While the disclosed techniques have been described above in the context of generating geospatial lane data for segments and nodes in the horizontal plane, it should be understood that geospatial lane data being generated by the disclosed techniques could include elevation information as well. In this respect, the process of deriving elevation information for a lane as part of the disclosed techniques may take various forms.

As one possibility, in order to derive elevation information for a lane of a given segment within a road network, the example pipeline may identify and use derived vehicle trajectories that incorporate elevation information, in which case the clusters that are identified by the example pipeline may also incorporate elevation information (i.e., the pose values of the trajectories and the reference points of the clusters may be represented in three dimensions instead of two dimensions). However, in practice, the elevation information that is incorporated into the identified trajectories will initially be reflective of the elevation of the sensors that were used to collect the trajectories, rather than the elevation of the lanes themselves.

As such, before identifying the clusters of sampling points that are used to derive the geospatial lane data, the example pipeline may function to adjust the elevation information that is incorporated into each identified trajectory by an offset that reflects an expected height above ground level of the sensor that was used to capture the sensor data from which the trajectory was derived. For example, if the sensor used to capture the sensor data from which a trajectory was derived was a monocular camera, the example pipeline may function to adjust the elevation information that is incorporated into the trajectory by an offset that reflects an expected height above ground level of the monocular camera (e.g., 1.5 meters). As another example, if the sensor used to capture the sensor data from which a trajectory was derived was a LiDAR sensor, the example pipeline may function to adjust the elevation information that is incorporated into the trajectory by an offset that reflects an expected height above ground level of the LiDAR sensor (e.g., 2 meters). Other types of sensors and corresponding offsets are possible as well.

Once the elevation information in the identified trajectories is adjusted in this manner, the example pipeline may then function to identify clusters in the same manner described above with reference to blocks 303-309, and those identified clusters may then incorporate elevation information that is reflective of the elevation of the lane for the given segment. In turn, as part of the function of defining the geometry of the lane based on the identified clusters at blocks 310-311, the example pipeline may define elevation data for the lane, which may then be included within the geospatial lane data for the given segment along with the other lane data described above. And in turn, the elevation information included within the geospatial lane data for different segments may be used to define elevation information within geospatial lane data for a node.

After the elevation information is derived for a lane, the elevation information can be used in various ways. For instance, as one possibility, the elevation information can be used to determine characteristics about the segment for which the geospatial lane data is being generated, such as whether the segment corresponds to a bridge, tunnel, highway, and/or parking garage. As another possibility, the elevation information can be used by an on-board computing system of a vehicle to better control the vehicle (e.g., the on-board computing system can cause the vehicle to accelerate before an inclining part of the road). As yet another possibility, the elevation information can be used by a transportation-matching system when planning routes for a vehicle (e.g., the transportation-matching system can select a route that avoids hills as to conserve fuel of the vehicle). The elevation information can be used in various other ways as well.

While the disclosed techniques have been described above in the context of generating geospatial lane data for traffic lanes on which vehicles travel from one location to another, it should be understood that the disclosed techniques may also be used to generate geospatial lane data for other types of lanes as well, such as dedicated bus lanes and/or bike lanes, among others. For instance, in order to accomplish this, the disclosed techniques could be used to (i) identify a set of derived trajectories for a particular type of agent that is associated with a particular type of lane (e.g., derived trajectories for a bus if generating geospatial lane data for a dedicated bus lane), and (ii) analyze the set of derived trajectories in the manner described in order to generate geospatial lane data for the particular type of lane.

Figure 5:
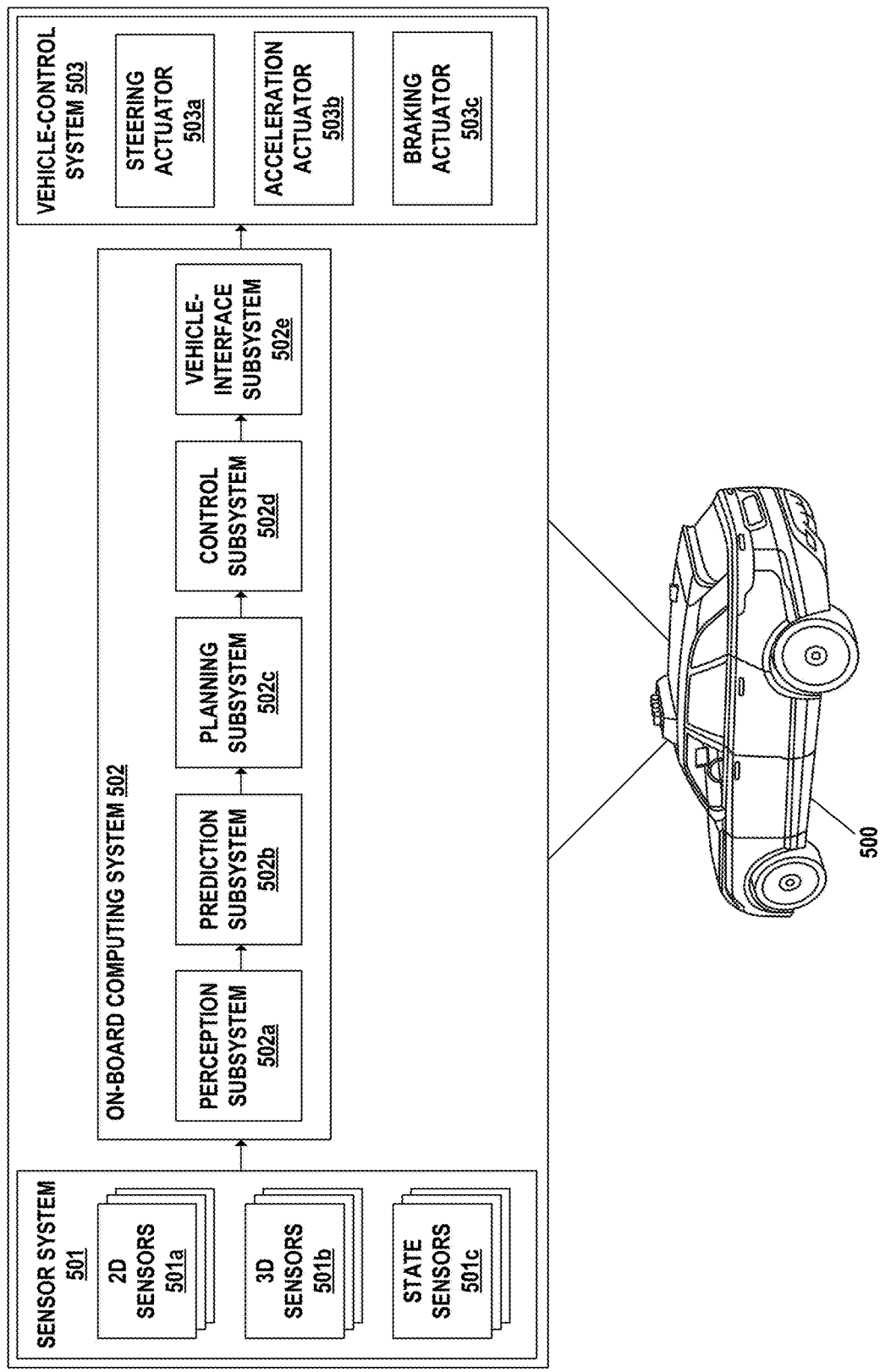
FIG. 5 is a simplified block diagram that illustrates certain systems that may be included in an example vehicle.

In line with the discussion above, one possible use case for the geospatial lane information that is derived using the disclosed techniques is for purposes of informing operations that are performed by an on-board computing system of a vehicle. Turning now to FIG. 5, a simplified block diagram is provided to illustrate certain systems that may be included in one possible example of a vehicle 500 that may make use of such geospatial lane data. As shown, at a high level, vehicle 500 may include at least (i) a sensor system 501 that is configured to capture sensor data that is representative of the real-world environment being perceived by the vehicle (i.e., the vehicle's "surrounding environment") and/or the vehicle's operation within that real-world environment, (ii) an on-board computing system 502 that is configured to perform functions related to autonomous operation of vehicle 500 (and perhaps other functions as well), and (iii) a vehicle-control system 503 that is configured to control the physical operation of vehicle 500, among other possibilities. Each of these systems may take various forms.

In general, sensor system 501 may comprise any of various different types of sensors, each of which is generally configured to detect one or more particular stimuli based on vehicle 500 operating in a real-world environment. The sensors then output sensor data that is indicative of one or more measured values of the one or more stimuli at one or more capture times (which may each comprise a single instant of time or a range of times).

For instance, as one possibility, sensor system 501 may include one or more 2D sensors 501a that are each configured to capture 2D sensor data that is representative of the vehicle's surrounding environment. Examples of 2D sensor (s) 501a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 501a may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 501 may include one or more 3D sensors 501b that are each configured to capture 3D sensor data that is representative of the vehicle's surrounding environment. Examples of 3D sensor(s) 501b may include a LiDAR unit, a 3D RADAR unit, a 3D SONAR unit, a 3D ultrasound unit, and a camera array equipped for stereo vision, among other possibilities. Further, in an example implementation, 3D sensor(s) 501b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 501 may include one or more state sensors 501c that are each configured capture sensor data that is indicative of aspects of the vehicle's current state, such as the vehicle's current position, current orientation (e.g., heading/yaw, pitch, and/or roll), current velocity, and/or current acceleration of vehicle 500. Examples of state sensor(s) 501c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 501 may include various other types of sensors as well.

In turn, on-board computing system 502 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 502 may take the form of any one or more interfaces that facilitate communication with other systems of vehicle 500 (e.g., sensor system 501, vehicle-control system 503, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 502 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 502 such that on-board computing system 502 is configured to perform various functions related to the autonomous operation of vehicle 500 (among other possible functions), and (ii) data that may be obtained, derived, or otherwise stored by on-board computing system 502.

In one embodiment, on-board computing system 502 may also be functionally configured into a number of different subsystems that are each tasked with performing a specific subset of functions that facilitate the autonomous operation of vehicle 500, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 502.

As shown in FIG. 5, in one embodiment, the functional subsystems of on-board computing system 502 may include (i) a perception subsystem 502a that generally functions to derive a representation of the surrounding environment being perceived by vehicle 500, (ii) a prediction subsystem 502b that generally functions to predict the future state of each object detected in the vehicle's surrounding environment, (iii) a planning subsystem 502c that generally functions to derive a behavior plan for vehicle 500, (iv) a control subsystem 502d that generally functions to transform the behavior plan for vehicle 500 into control signals for causing vehicle 500 to execute the behavior plan, and (v) a vehicle-interface subsystem 502e that generally functions to translate the control signals into a format that vehicle-control system 503 can interpret and execute. However, it should be understood that the functional subsystems of on-board computing system 502 may take various other forms as well. Each of these example subsystems will now be described in further detail below.

For instance, the subsystems of on-board computing system 502 may begin with perception subsystem 502*a*, which may be configured to fuse together various different types of "raw" data that relate to the vehicle's perception of its surrounding environment and thereby derive a representation of the surrounding environment being perceived by vehicle 500. In this respect, the "raw" data that is used by perception subsystem 502*a* to derive the representation of the vehicle's surrounding environment may take any of various forms.

For instance, at a minimum, the "raw" data that is used by perception subsystem 502*a* may include multiple different types of sensor data captured by sensor system 501, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 500 that indicates the past and current position, orientation, velocity, and acceleration of vehicle 500. Additionally, the "raw" data that is used by perception subsystem 502*a* may include map data associated with the vehicle's location, such as high-definition geometric and/or semantic map data, which may be preloaded onto on-board computing system 502 and/or obtained from a remote computing system. Additionally yet, the "raw" data that is used by perception subsystem 502*a* may include navigation data for vehicle 500 that indicates a specified origin and/or specified destination for vehicle 500, which may be obtained from a remote computing system (e.g., a transportation-matching system) and/or input by a human riding in vehicle 500 via a user-interface component that is communicatively coupled to on-board computing system 502. Additionally still, the "raw" data that is used by perception subsystem 502*a* may include other types of data that may provide context for the vehicle's perception of its surrounding environment, such as weather data and/or traffic data, which may be obtained from a remote computing system. The "raw" data that is used by perception subsystem 502*a* may include other types of data as well.

Advantageously, by fusing together multiple different types of raw data (e.g., both 2D sensor data and 3D sensor data), perception subsystem 502*a* is able to leverage the relative strengths of these different types of raw data in a way that may produce a more accurate and precise representation of the surrounding environment being perceived by vehicle 500.

Further, the function of deriving the representation of the surrounding environment perceived by vehicle 500 using the raw data may include various aspects. For instance, one aspect of deriving the representation of the surrounding environment perceived by vehicle 500 using the raw data may involve determining a current state of vehicle 500 itself, such as a current position, a current orientation, a current velocity, and/or a current acceleration, among other possibilities. In this respect, perception subsystem 502*a* may also employ a localization technique such as SLAM to assist in the determination of the vehicle's current position and/or orientation. (Alternatively, it is possible that on-board computing system 502 may run a separate localization service that determines position and/or orientation values for vehicle 500 based on raw data, in which case these position and/or orientation values may serve as another input to perception sub system 502*a*).

Another aspect of deriving the representation of the surrounding environment perceived by vehicle 500 using the raw data may involve detecting objects within the vehicle's surrounding environment, which may result in the determination of class labels, bounding boxes, or the like for each detected object. In this respect, the particular classes of objects that are detected by perception subsystem 502*a* (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 502*a* may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 500 using the raw data may involve determining a current state of each object detected in the vehicle's surrounding environment, such as a current position (which could be reflected in terms of coordinates and/or in terms of a distance and direction from vehicle 500), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 500, among other possibilities.

The function of deriving the representation of the surrounding environment perceived by vehicle 500 using the raw data may include other aspects as well.

Further yet, the derived representation of the surrounding environment perceived by vehicle 500 may incorporate various different information about the surrounding environment perceived by vehicle 500, examples of which may include (i) a respective set of information for each object detected in the vehicle's surrounding, such as a class label, a bounding box, and/or state information for each detected object, (ii) a set of information for vehicle 500 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 500 may incorporate other types of information about the surrounding environment perceived by vehicle 500 as well.

Still further, the derived representation of the surrounding environment perceived by vehicle 500 may be embodied in various forms. For instance, as one possibility, the derived representation of the surrounding environment perceived by vehicle 500 may be embodied in the form of a data structure that represents the surrounding environment perceived by vehicle 500, which may comprise respective data arrays (e.g., vectors) that contain information about the objects detected in the surrounding environment perceived by vehicle 500, a data array that contains information about vehicle 500, and/or one or more data arrays that contain other semantic information about the surrounding environment. Such a data structure may be referred to as a "parameter-based encoding."

As another possibility, the derived representation of the surrounding environment perceived by vehicle 500 may be embodied in the form of a rasterized image that represents the surrounding environment perceived by vehicle 500 in the form of colored pixels. In this respect, the rasterized image may represent the surrounding environment perceived by vehicle 500 from various different visual perspectives, examples of which may include a "top down" view and a "bird's eye" view of the surrounding environment, among other possibilities. Further, in the rasterized image, the objects detected in the surrounding environment of vehicle 500 (and perhaps vehicle 500 itself) could be shown as color-coded bitmasks and/or bounding boxes, among other possibilities.

The derived representation of the surrounding environment perceived by vehicle 500 may be embodied in other forms as well.

As shown, perception subsystem 502a may pass its derived representation of the vehicle's surrounding environment to prediction subsystem 502b. In turn, prediction subsystem 502b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 500 to anticipate how the real-world objects in its surrounding environment are likely to behave in the future and then plan its behavior in a way that accounts for this future behavior.

Prediction subsystem 502b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 502b is configured to predict this type of future state information for a detected object at multiple future times, such a time sequence of future states may collectively define a predicted future trajectory of the detected object. Further, in some embodiments, prediction subsystem 502b could be configured to predict multiple different possibilities of future states for a detected object (e.g., by predicting the 3 most-likely future trajectories of the detected object). Prediction subsystem 502b may be configured to predict other aspects of a detected object's future behavior as well.

In practice, prediction subsystem 502b may predict a future state of an object detected in the vehicle's surrounding environment in various manners, which may depend in part on the type of detected object. For instance, as one possibility, prediction subsystem 502b may predict the future state of a detected object using a data science model that is configured to (i) receive input data that includes one or more derived representations output by perception subsystem 502a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 502, although it is possible that a future-state model could be created by on-board computing system 502 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 502b could predict the future state of a detected object in other manners as well. For instance, for detected objects that have been classified by perception subsystem 502a as belonging to certain classes of static objects (e.g., roads, curbs, lane markings, etc.), which generally do not have the potential to move, prediction subsystem 502b may rely on this classification as a basis for predicting that the future state of the detected object will remain the same at each of the one or more future times (in which case the state-prediction model may not be used for such detected objects). However, it should be understood that detected objects may be classified by perception subsystem 502a as belonging to other classes of static objects that have the potential to change state despite not having the potential to move, in which case prediction subsystem 502b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 500.

After predicting the future state of each object detected in the surrounding environment perceived by vehicle 500 at one or more future times, prediction subsystem 502b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 502b may pass the one or more derived representations of the vehicle's surrounding environment to planning subsystem 502c. In turn, planning subsystem 502c may be configured to use the one or more derived representations of the vehicle's surrounding environment (and perhaps other data) to derive a behavior plan for vehicle 500, which defines the desired driving behavior of vehicle 500 for some future period of time (e.g., the next 5 seconds).

The behavior plan that is derived for vehicle 500 may take various forms. For instance, as one possibility, the derived behavior plan for vehicle 500 may comprise a planned trajectory for vehicle 500 that specifies a planned state of vehicle 500 at each of one or more future times (e.g., each second over the next 5 seconds), where the planned state for each future time may include a planned position of vehicle 500 at the future time, a planned orientation of vehicle 500 at the future time, a planned velocity of vehicle 500 at the future time, and/or a planned acceleration of vehicle 500 (whether positive or negative) at the future time, among other possible types of state information. As another possibility, the derived behavior plan for vehicle 500 may comprise one or more planned actions that are to be performed by vehicle 500 during the future window of time, where each planned action is defined in terms of the type of action to be performed by vehicle 500 and a time and/or location at which vehicle 500 is to perform the action, among other possibilities. The derived behavior plan for vehicle 500 may define other planned aspects of the vehicle's behavior as well.

Further, in practice, planning subsystem 502c may derive the behavior plan for vehicle 500 in various manners. For instance, as one possibility, planning subsystem 502c may be configured to derive the behavior plan for vehicle 500 by (i) deriving a plurality of different "candidate" behavior plans for vehicle 500 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 500. Planning subsystem 502c may derive the behavior plan for vehicle 500 in various other manners as well.

After deriving the behavior plan for vehicle 500, planning subsystem 502c may pass data indicating the derived behavior plan to control subsystem 502d. In turn, control subsystem 502d may be configured to transform the behavior plan for vehicle 500 into one or more control signals (e.g., a set of one or more command messages) for causing vehicle 500 to execute the behavior plan. For instance, based on the behavior plan for vehicle 500, control subsystem 502d may be configured to generate control signals for causing vehicle 500 to adjust its steering in a specified manner, accelerate in a specified manner, and/or brake in a specified manner, among other possibilities.

As shown, control subsystem 502d may then pass the one or more control signals for causing vehicle 500 to execute the behavior plan to vehicle-interface subsystem 502e. In turn, vehicle-interface subsystem 502e may be configured to translate the one or more control signals into a format that can be interpreted and executed by components of vehicle-control system 503. For example, vehicle-interface subsystem 502e may be configured to translate the one or more control signals into one or more control messages are defined according to a particular format or standard, such as a CAN bus standard and/or some other format or standard that is used by components of vehicle-control system 503.

In turn, vehicle-interface subsystem 502e may be configured to direct the one or more control signals to the appropriate control components of vehicle-control system 503. For instance, as shown, vehicle-control system 503 may include a plurality of actuators that are each configured to control a respective aspect of the vehicle's physical operation, such as a steering actuator 503a that is configured to control the vehicle components responsible for steering (not shown), an acceleration actuator 503b that is configured to control the vehicle components responsible for acceleration such as a throttle (not shown), and a braking actuator 503c that is configured to control the vehicle components responsible for braking (not shown), among other possibilities. In such an arrangement, vehicle-interface subsystem 502e of on-board computing system 502 may be configured to direct steering-related control signals to steering actuator 503a, acceleration-related control signals to acceleration actuator 503b, and braking-related control signals to braking actuator 503c. However, it should be understood that the control components of vehicle-control system 503 may take various other forms as well.

Notably, the subsystems of on-board computing system 502 may be configured to perform the above functions in a repeated manner, such as many times per second, which may enable vehicle 500 to continually update both its understanding of the surrounding environment and its planned behavior within that surrounding environment.

Although not specifically shown, it should be understood that vehicle 500 includes various other systems and components as well, including but not limited to a propulsion system that is responsible for creating the force that leads to the physical movement of vehicle 500.

Figure 6:
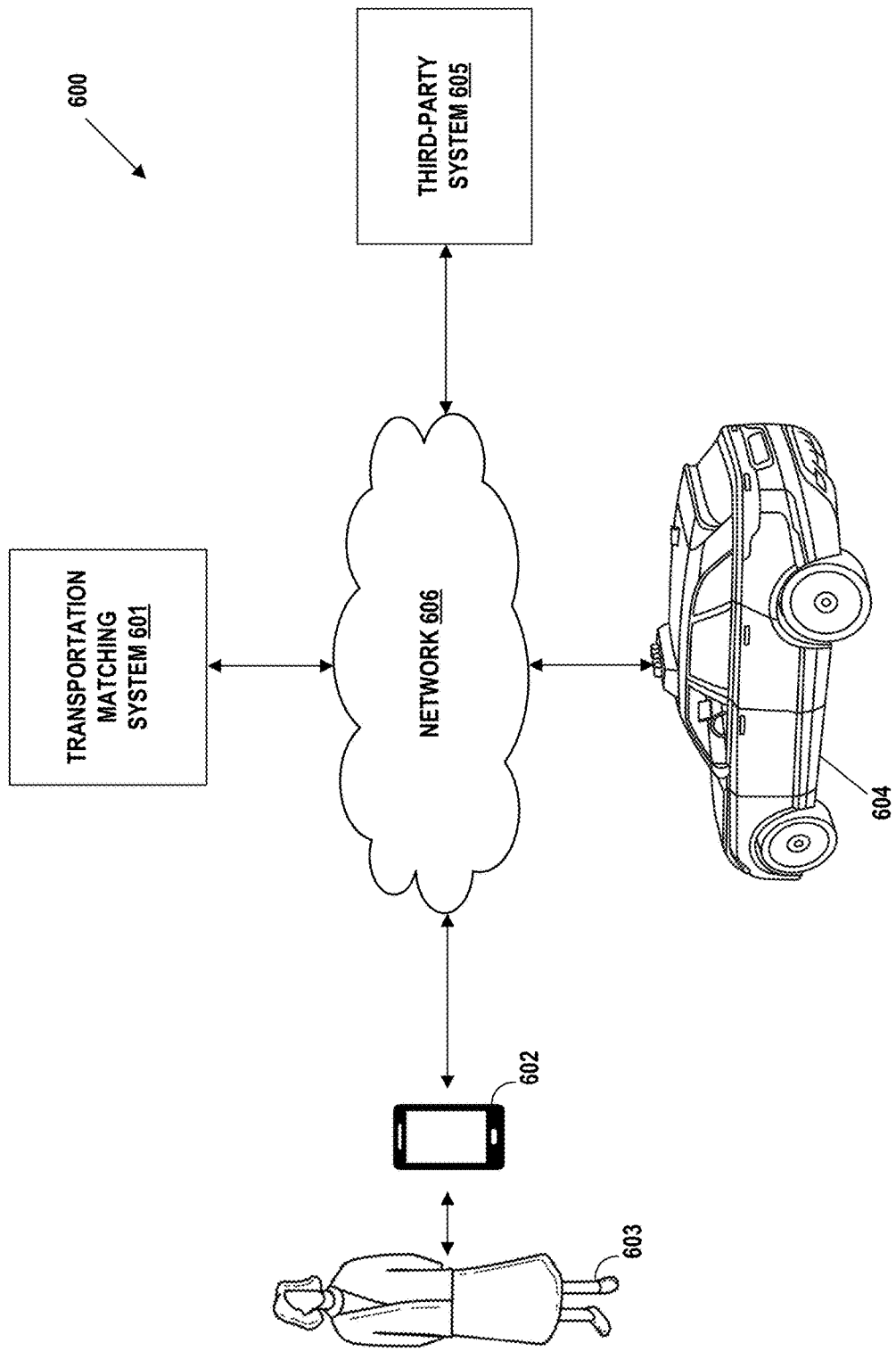
FIG. 6 is a simplified block diagram that illustrates one example of a transportation-matching platform.

In line with the discussion above, another possible use case for the geospatial lane information that is derived using the disclosed techniques is for purposes of informing operations that are performed by a transportation-matching platform. Turning now to FIG. 6, a simplified block diagram is provided to illustrate one possible example of a transportation-matching platform 600 that functions to match individuals interested in obtaining transportation from one location to another with transportation options, such as vehicles that are capable of providing the requested transportation. As shown, transportation-matching platform 600 may include at its core a transportation-matching system 601, which may be communicatively coupled via a communication network 606 to (i) a plurality of client stations of individuals interested in transportation (i.e., "transportation requestors"), of which client station 602 of transportation requestor 603 is shown as one representative example, (ii) a plurality of vehicles that are capable of providing the requested transportation, of which vehicle 604 is shown as one representative example, and (iii) a plurality of third-party systems that are capable of providing respective sub-services that facilitate the platform's transportation matching, of which third-party system 605 is shown as one representative example.

Broadly speaking, transportation-matching system 601 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 601 may comprise computing infrastructure of a public, private, and/or hybrid cloud (e.g., computing and/or storage clusters). In this respect, the entity that owns and operates transportation-matching system 601 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 601 may comprise one or more dedicated servers. Other implementations of transportation-matching system 601 are possible as well.

As noted, transportation-matching system 601 may be configured to perform functions related to managing and facilitating transportation matching, which may take various forms. For instance, as one possibility, transportation-matching system 601 may be configured to receive transportation requests from client stations of transportation requestors (e.g., client station 602 of transportation requestor 603) and then fulfill such transportation requests by dispatching suitable vehicles, which may include vehicle 604. In this respect, a transportation request from client station 602 of transportation requestor 603 may include various types of information.

For example, a transportation request from client station 602 of transportation requestor 603 may include specified pick-up and drop-off locations for the transportation. As another example, a transportation request from client station 602 of transportation requestor 603 may include an identifier that identifies transportation requestor 603 in transportation-matching system 601, which may be used by transportation-matching system 601 to access information about transportation requestor 603 (e.g., profile information) that is stored in one or more data stores of transportation-matching system 601 (e.g., a relational database system), in accordance with the transportation requestor's privacy settings. This transportation requestor information may take various forms, examples of which include profile information about transportation requestor 603. As yet another example, a transportation request from client station 602 of transportation requestor 603 may include preferences information for transportation requestor 603, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 601 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 601 receives a request for transportation from San Francisco International Airport (SFO) to Palo Alto, Calif., system 601 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 601. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 601.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 601 could be configured to predict and provide transportation suggestions in response to a transportation request. For instance, transportation-matching system 601 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 601 may only be capable of storing and later accessing historical data for a given transportation requestor if the given transportation requestor previously decided to "opt-in" to having such information stored. In this respect, transportation-matching system 601 may maintain respective privacy settings for each transportation requestor that uses transportation-matching platform 600 and operate in accordance with these settings. For instance, if a given transportation requestor did not opt-in to having his or her information stored, then transportation-matching system 601 may forgo performing any of the above-mentioned functions based on historical data. Other possibilities also exist.

Transportation-matching system 601 may be configured to perform various other functions related to managing and facilitating transportation matching as well.

Referring again to FIG. 6, client station 602 of transportation requestor 603 may generally comprise any computing device that is configured to facilitate interaction between transportation requestor 603 and transportation-matching system 601. For instance, client station 602 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 603 and transportation-matching system 601 (which may be embodied in the form of a software application, such as a mobile application, web application, or the like). In this respect, the interaction that may take place between transportation requestor 603 and transportation-matching system 601 may take various forms, representative examples of which may include requests by transportation requestor 603 for new transportation events, confirmations by transportation-matching system 601 that transportation requestor 603 has been matched with a vehicle (e.g., vehicle 604), and updates by transportation-matching system 601 regarding the progress of the transportation event, among other possibilities.

In turn, vehicle 604 may generally comprise any kind of vehicle that can provide transportation, and in one example, may take the form of vehicle 500 described above. Further, the functionality carried out by vehicle 604 as part of transportation-matching platform 600 may take various forms, representative examples of which may include receiving a request from transportation-matching system 601 to handle a new transportation event, driving to a specified pickup location for a transportation event, driving from a specified pickup location to a specified drop-off location for a transportation event, and providing updates regarding the progress of a transportation event to transportation-matching system 601, among other possibilities.

Generally speaking, third-party system 605 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 601.

Moreover, third-party system 605 may be configured to perform functions related to various subservices. For instance, as one possibility, third-party system 605 may be configured to monitor traffic conditions and provide traffic data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the vehicle's behavior plan, among other possibilities.

As another possibility, third-party system 605 may be configured to monitor weather conditions and provide weather data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the vehicle's behavior plan, among other possibilities.

As yet another possibility, third-party system 605 may be configured to authorize and process electronic payments for transportation requests. For example, after transportation requestor 603 submits a request for a new transportation event via client station 602, third-party system 605 may be configured to confirm that an electronic payment method for transportation requestor 603 is valid and authorized and then inform transportation-matching system 601 of this confirmation, which may cause transportation-matching system 601 to dispatch vehicle 604 to pick up transportation requestor 603. After receiving a notification that the transportation event is complete, third-party system 605 may then charge the authorized electronic payment method for transportation requestor 603 according to the fare for the transportation event. Other possibilities also exist.

Third-party system 605 may be configured to perform various other functions related to subservices that facilitate the platform's transportation matching as well. It should be understood that, although certain functions were discussed as being performed by third-party system 605, some or all of these functions may instead be performed by transportation-matching system 601.

As discussed above, transportation-matching system 601 may be communicatively coupled to client station 602, vehicle 604, and third-party system 605 via communication network 606, which may take various forms. For instance, at a high level, communication network 606 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 6 may take other forms as well, including the possibility that such communication paths include communication links and/or intermediate devices that are not shown.

In the foregoing arrangement, client station 602, vehicle 604, and/or third-party system 605 may also be capable of indirectly communicating with one another via transportation-matching system 601. Additionally, although not shown, it is possible that client station 602, vehicle 604, and/or third-party system 605 may be configured to communicate directly with one another as well (e.g., via a short-range wireless communication path or the like). Further, vehicle 604 may also include a user-interface system that may facilitate direct interaction between transportation requestor 603 and vehicle 604 once transportation requestor 603 enters vehicle 604 and the transportation event begins.

It should be understood that transportation-matching platform 600 may include various other entities and take various other forms as well.

Turning now to FIG. 7, a simplified block diagram is provided to illustrate some structural components that may be included in an example computing platform 700, which may be configured to carry out the any of various functions disclosed herein—including but not limited to the functions include in the example pipeline described with reference to FIGS. 2, 3A-3M, and 4A-4F. At a high level, computing platform 700 may generally comprise any one or more computer systems (e.g., one or more servers) that collectively include at least a processor 702, data storage 704, and a communication interface 706, all of which may be communicatively linked by a communication link 708 that may take the form of a system bus, a communication network such as a public, private, or hybrid cloud, or some other connection mechanism. Each of these components may take various forms.

For instance, processor 702 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, data storage 704 may be capable of storing both (i) program instructions that are executable by processor 702 such that computing platform 700 is configured to perform any of the various functions disclosed herein (including but not limited to any the functions described with reference to FIGS. 2, 3A-3M, and 4A-4F), and (ii) data that may be received, derived, or otherwise stored by computing platform 700.

Communication interface 706 may take the form of any one or more interfaces that facilitate communication between computing platform 700 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 700 may additionally include one or more input/output (I/O) interfaces that are configured to either (i) receive and/or capture information at computing platform 700 and (ii) output information from computing platform 700 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 700 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
identifying a set of vehicle trajectories that are associated with a segment of a road network, wherein the set of vehicle trajectories are derived by applying processing to sensor data captured by sensor-equipped vehicles;
identifying a first cluster of sampling points that represent intersections between the identified set of vehicle trajectories and a first sampling position along the segment, wherein the first cluster has an associated geospatial position, and wherein the first cluster is inferred to be associated with one given lane of the segment;
based on the geospatial position of the first cluster, identifying a subset of vehicle trajectories in the identified set that are inferred to be associated with the given lane between the first sampling position and a second sampling position along the segment;
identifying a second cluster of sampling points that represent intersections between the identified subset of vehicle trajectories and the second sampling position, wherein the second cluster has an associated geospatial position; and
based at least on the geospatial positions of the first and second clusters, determining a geospatial geometry of the given lane;
encoding the determined geospatial geometry of the given lane into a map of the road network; and
transmitting the map of the road network to a computing system that is configured to determine a location of at least one vehicle within the road network, wherein the map is thereafter utilized by the computing system to determine the location of the at least one vehicle within the road network.

2. The computer-implemented method of claim 1, wherein identifying the set of vehicle trajectories that are associated with the segment of the road network comprises:
defining an area of interest around the segment;
accessing a repository of available vehicle trajectories associated with the segment; and
identifying, from within the repository of available vehicle trajectories associated with the segment, each vehicle trajectory that at least partially overlaps with the defined area of interest.

3. The computer-implemented method of claim 1, wherein the first sampling position is defined by a centroid of the segment, and wherein the second sampling position is defined by a point along the segment that is a given distance from the centroid of the segment in a first direction along the segment.

4. The computer-implemented method of claim 3, wherein the first direction is parallel to a direction of travel associated with the set of vehicle trajectories.

5. The computer-implemented method of claim 3, wherein the subset of trajectories that are inferred to be associated with the given lane between the first sampling position and the second sampling position comprises a first subset of trajectories, and wherein the method further comprises:
based on the geospatial position of the first cluster, identifying a second subset of trajectories in the identified set that are inferred to be associated with the given lane between the first sampling position and a third sampling position that is defined by a point along the segment that is a given distance from the centroid of the segment in a second direction along the segment; and identifying a third cluster of sampling points between the second subset of trajectories and the third sampling position, wherein the third cluster is also used as a basis for determining the geospatial geometry of the given lane.

6. The computer-implemented method of claim 1, wherein identifying the subset of vehicle trajectories that are inferred to be associated with the given lane between the first sampling position and the second sampling position based on the geospatial position of the first cluster comprises:

defining an area of interest around the geospatial position of the first cluster; and identifying, from within the identified set of vehicle trajectories, each vehicle trajectory that at least partially overlaps with the defined area of interest.

7. The computer-implemented method of claim 1, wherein:

identifying the first cluster comprises determining a first reference point that is representative of the first cluster; and identifying the second cluster comprises determining a second reference point that is representative of the second cluster.

8. The computer-implemented method of claim 7, wherein:

determining the first reference point that is representative of the first cluster comprises determining a weighted average of the sampling points associated with the first cluster that is based on confidence levels assigned to the trajectories in the identified set; and determining the second reference point that is representative of the second cluster comprises determining a weighted average of the sampling points associated with the first cluster that is based on confidence levels assigned to the trajectories in the identified subset.

9. The computer-implemented method of claim 8, wherein the confidence levels assigned to the trajectories in the identified set are based on one or more of (i) a type of sensor data used to derive the trajectories in the identified subset or (ii) a type of technique used to derive the trajectories in the identified subset.

10. The computer-implemented method of claim 1, wherein determining the geospatial geometry comprises:

based at least on the geospatial positions of the first and second clusters, defining (i) a centerline for the given lane; and (ii) boundaries for the given lane.

11. The computer-implemented method of claim 10, wherein defining the boundaries for the given lane comprises:

using the geospatial positions of the first and second clusters as a basis for defining an initial set of geospatial position information for the boundaries of the given lane;

accessing image data that is associated with the initial set of geospatial position information for the boundaries of the given lane;

detecting lane boundaries within the image data;

determining geospatial position information for the detected lane boundaries; and using the determined geospatial position information for the detected lane boundaries to update the initial set of position information for the boundaries of the given lane.

12. The computer-implemented method of claim 1, wherein the set of vehicle trajectories that are associated with the segment of the road network comprises a first set of vehicle trajectories, the method further comprising:

identifying a second set of vehicle trajectories that are associated with a node positioned between two or more segments of the road network, wherein each of the two or more segments has at least one lane;

for each vehicle trajectory in the second set, identifying a respective combination of lanes of the two or more segments that comprises an origin lane and a destination lane associated with the vehicle trajectory; and based on the respective combinations of lanes for the vehicle trajectories in the second set, identifying one or more connections between lanes of the two or more segments; and for each of the identified one or more connections, defining a junction lane for the node.

13. The computer-implemented method of claim 1, wherein the map is utilized by the computing system to determine the location of the at least one vehicle within the road network as part of a process for determining the location of the at least one vehicle over time.

14. The computer-implemented method of claim 1, wherein the computing system comprises either (1) a transportation-matching platform or (ii) an on-board computing system of the vehicle.

15. A non-transitory computer-readable medium comprising program instructions stored thereon that, when executed by at least one processor of a computing system, cause the computing system to perform functions comprising:

identifying a set of vehicle trajectories that are associated with a segment of a road network, wherein the set of vehicle trajectories are derived by applying processing to sensor data captured by sensor-equipped vehicles;

identifying a first cluster of sampling points that represent intersections between the identified set of vehicle trajectories and a first sampling position along the segment, wherein the first cluster has an associated geospatial position, and wherein the first cluster is inferred to be associated with one given lane of the segment;

based on the geospatial position of the first cluster, identifying a subset of vehicle trajectories in the identified set that are inferred to be associated with the given lane between the first sampling position and a second sampling position along the segment;

identifying a second cluster of sampling points that represent intersections between the identified subset of vehicle trajectories and the second sampling position, wherein the second cluster has an associated geospatial position; and based at least on the geospatial positions of the first and second clusters, determining a geospatial geometry of the given lane;

encoding the determined geospatial geometry of the given lane into a map of the road network; and transmitting the map of the road network to a computing system that is configured to determine a location of at least one vehicle within the road network, wherein the map is thereafter utilized by the computing system to determine the location of the at least one vehicle within the road network.

16. The non-transitory computer-readable medium of claim 15, wherein identifying the set of vehicle trajectories that are associated with the segment of the road network comprises:
  defining an area of interest around the segment;
  accessing a repository of available vehicle trajectories associated with the segment; and
  identifying, from within the repository of available vehicle trajectories associated with the segment, each vehicle trajectory that at least partially overlaps with the defined area of interest.

17. The non-transitory computer-readable medium of claim 15, wherein the first sampling position is defined by a centroid of the segment, and wherein the second sampling position is defined by a point along the segment that is a given distance from the centroid of the segment in a first direction along the segment.

18. The non-transitory computer-readable medium of claim 17, wherein the subset of trajectories that are inferred to be associated with the given lane between the first sampling position and the second sampling position comprises a first subset of trajectories, and wherein the non-transitory computer-readable medium further comprises program instructions stored thereon that, when executed by the at least one processor of the computing system, cause the computing system to perform functions comprising:
  based on the geospatial position of the first cluster, identifying a second subset of trajectories in the identified set that are inferred to be associated with the given lane between the first sampling position and a third sampling position that is defined by a point along the segment that is a given distance from the centroid of the segment in a second direction along the segment; and
  identifying a third cluster of sampling points between the second subset of trajectories and the third sampling position, wherein the third cluster is also used as a basis for determining the geospatial geometry of the given lane.

19. The non-transitory computer-readable medium of claim 15, wherein identifying the subset of vehicle trajectories that are inferred to be associated with the given lane between the first sampling position and the second sampling position based on the geospatial position of the first cluster comprises:
  defining an area of interest around the geospatial position of the first cluster; and
  identifying, from within the identified set of vehicle trajectories, each vehicle trajectory that at least partially overlaps with the defined area of interest.

20. The non-transitory computer-readable medium of claim 15, wherein the map is utilized by the computing system to determine the location of the at least one vehicle within the road network as part of a process for determining the location of the at least one vehicle over time.

21. The non-transitory computer-readable medium of claim 15, wherein the computing system comprises either (i) a transportation-matching platform or (ii) an on-board computing system of the vehicle.

22. A computing system comprising:
  at least one processor;
  a non-transitory computer-readable medium; and
  program instructions stored on the non-transitory computer-readable medium that are executable by the at least one processor such that the computing system is configured to:
  identify a set of vehicle trajectories that are associated with a segment of a road network, wherein the set of vehicle trajectories are derived by applying processing to sensor data captured by sensor-equipped vehicles;
  identify a first cluster of sampling points that represent intersections between the identified set of vehicle trajectories and a first sampling position along the segment, wherein the first cluster has an associated geospatial position, and wherein the first cluster is inferred to be associated with one given lane of the segment;
  based on the geospatial position of the first cluster, identify a subset of vehicle trajectories in the identified set that are inferred to be associated with the given lane between the first sampling position and a second sampling position along the segment;
  identify a second cluster of sampling points that represent intersections between the identified subset of vehicle trajectories and the second sampling position, wherein the second cluster has an associated geospatial position; and
  based at least on the geospatial positions of the first and second clusters, determine a geospatial geometry of the given lane;
  encode the determined geospatial geometry of the given lane into a map of the road network; and
  transmit the map of the road network to a computing system that is configured to determine a location of at least one vehicle within the road network, wherein the map is thereafter utilized by the computing system to determine the location of the at least one vehicle within the road network.

* * * * *